United States Patent
Ishibashi et al.

(10) Patent No.: US 7,911,907 B2
(45) Date of Patent: Mar. 22, 2011

(54) OPTICAL DISC JUDGMENT METHOD AND OPTICAL DISC DEVICE

(75) Inventors: Hiroshige Ishibashi, Osaka (JP); Katsuya Watanabe, Nara (JP); Takashi Kishimoto, Nara (JP); Rie Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 452 days.

(21) Appl. No.: 11/816,000

(22) PCT Filed: Feb. 17, 2006

(86) PCT No.: PCT/JP2006/302881
§ 371 (c)(1),
(2), (4) Date: Aug. 10, 2007

(87) PCT Pub. No.: WO2006/088157
PCT Pub. Date: Aug. 24, 2006

(65) Prior Publication Data
US 2009/0010129 A1    Jan. 8, 2009

(30) Foreign Application Priority Data
Feb. 18, 2005   (JP) ................ 2005-041972

(51) Int. Cl.
| | |
|---|---|
| G11B 5/58 | (2006.01) |
| G11B 15/04 | (2006.01) |
| G11B 19/04 | (2006.01) |
| G11B 11/00 | (2006.01) |
| G11B 7/00 | (2006.01) |
| G11B 5/09 | (2006.01) |
| G11B 15/52 | (2006.01) |
| G11B 19/02 | (2006.01) |
| G11B 20/10 | (2006.01) |
| G11B 5/86 | (2006.01) |

(52) U.S. Cl. ............. 369/53.22; 369/44.26; 369/47.11; 369/53.23

(58) Field of Classification Search ................ None
See application file for complete search history.

(56) References Cited

U.S. PATENT DOCUMENTS
6,747,931 B1 *   6/2004   Park .................... 369/53.23
(Continued)

FOREIGN PATENT DOCUMENTS
EP    1 041 553    10/2000
(Continued)

OTHER PUBLICATIONS

European Office Action for corresponding application No. EP06714022.8 dated Mar. 19, 2009.
(Continued)

*Primary Examiner* — Daniell L Negrón
(74) *Attorney, Agent, or Firm* — Renner, Otto, Boisselle & Sklar, LLP

(57) ABSTRACT

An optical disk apparatus according to the present invention is an optical disk apparatus for performing at least one of: recording data to a plurality of types of optical disks including a recordable optical disk and a read-only optical disk which are produced according to the BD specifications; and reproducing data from the optical disks. This apparatus includes: a means (506, 507) for irradiating a management area 502 of an optical disk 501 with a light beam while not performing tracking control, and generating a track position signal (push-pull TE or phase difference TE) from light which is reflected by the management area 502; and a disk determination means for determining, based on the track position signal obtained from the management area 502, whether the optical disk 501 mounted in the optical disk apparatus is a recordable optical disk or a read-only optical disk.

17 Claims, 17 Drawing Sheets

U.S. PATENT DOCUMENTS

| | | | | |
|---|---|---|---|---|
| 6,816,443 | B1 * | 11/2004 | Hwang | 369/44.32 |
| 7,102,989 | B2 * | 9/2006 | Suh et al. | 369/275.3 |
| 2004/0047249 | A1 * | 3/2004 | Lee et al. | 369/44.26 |
| 2005/0063261 | A1 * | 3/2005 | Kim et al. | 369/44.26 |
| 2005/0265189 | A1 | 12/2005 | Tai | |

FOREIGN PATENT DOCUMENTS

| | | |
|---|---|---|
| JP | 2000-182314 | 6/2000 |
| JP | 2002-133656 | 5/2002 |
| JP | 2005-071428 | 3/2005 |
| WO | 2004/006231 | 1/2004 |
| WO | 2004/019331 | 3/2004 |
| WO | 2006/016338 | 2/2006 |

OTHER PUBLICATIONS

Extended European Search Report issued on Jul. 22, 2008 for corresponding European Patent Application No. 06714022.8.

International Search Report for corresponding Application No. PCT/JP2006/302881 mailed May 23, 2006.

* cited by examiner

FIG.12
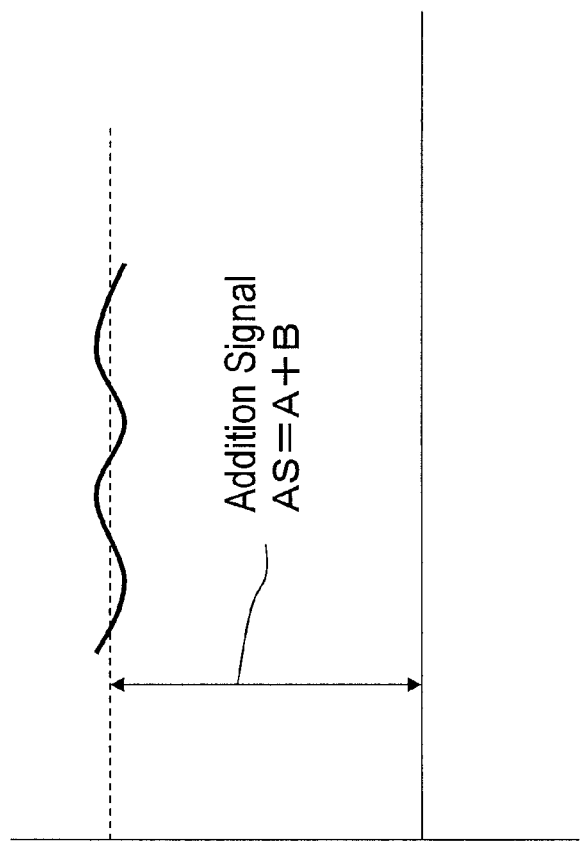
(a)
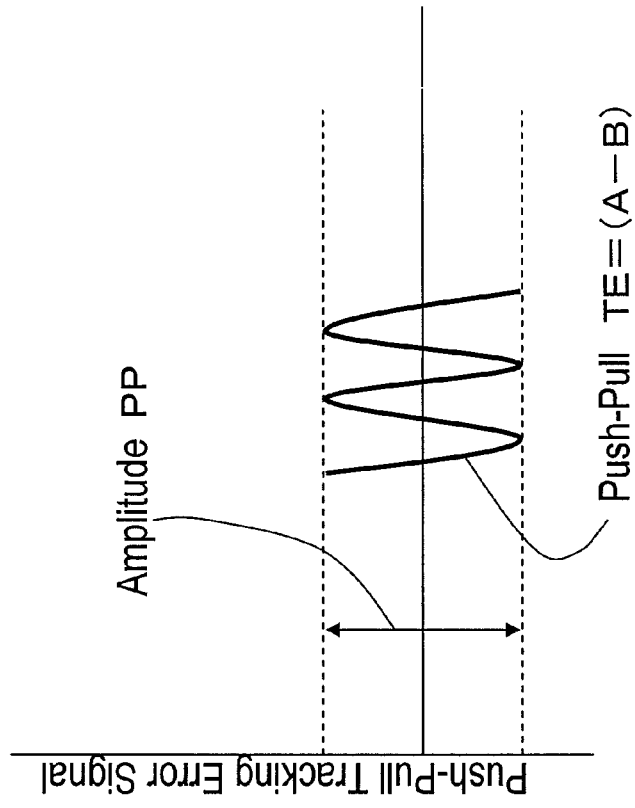
(b)

OPTICAL DISC JUDGMENT METHOD AND OPTICAL DISC DEVICE

TECHNICAL FIELD

The present invention relates to an optical disk apparatus which makes a determination between a recordable optical disk having an information track in the form of a guide groove and a read-only optical disk on which information is recorded in the form of emboss pits.

BACKGROUND ART

Optical disks are classified into recordable optical disks, e.g., DVD-Rs, and read-only optical disks, e.g., DVD-ROMs. For a DVD-R, tracking control is performed on the basis of a tracking error (push-pull TE) signal in the push-pull method, which is derived from a difference between reflected light from a guide groove (groove) of an optical disk. On the other hand, for a DVD-ROM, tracking control is performed on the basis of a tracking error (phase difference TE) signal in the phase difference method, which is derived based on a light beam spot and a time difference in passing through pits (physical protrusions and depressions: emboss pits). When a phase difference TE signal is employed, stable tracking control is achieved even when a lens shift or defocusing occurs.

In a conventional optical disk apparatus, it is necessary to determine whether a mounted optical disk is a read-only optical disk such as a DVD-ROM, or a recordable optical disk such as a DVD-R, and switch the tracking control method based on the result of determination. A method of determination by an optical disk apparatus between a recordable optical disk and a read-only optical disk is disclosed in Patent Document 1, for example.

On a read-only optical disk such as a DVD-ROM, data is recorded in the form of pits, and there is no guide groove that wobbles with a predetermined frequency or phase to record information. On the other hand, on a recordable optical disk such as a DVD-R, there is a guide groove that wobbles with a predetermined frequency or phase. Therefore, when a reproduction signal (RF signal) is generated from such a recordable optical disk, the reproduction signal will contain a signal (wobble signal) which is in accordance with the wobble of the guide groove. If a wobble signal can be extracted from a reproduction signal of an optical disk, it can be determined that the optical disk is not a DVD-ROM.

[Patent Document 1] Japanese Laid-Open Patent Publication No. 2002-133656

DISCLOSURE OF INVENTION

Problems to be Solved by the Invention

In the aforementioned conventional example, because of the need to extract a wobble signal from the reproduction signal, it is necessary, in order to make a disk determination, to perform tracking control for causing a light beam to follow along an information track on the optical disk. If a wobble signal cannot be extracted from the reproduction signal while performing tracking control based on a push-pull TE signal, it can be determined that the optical disk is a DVD-ROM. However, in this case, it is necessary for the tracking detection system to switch to the phase difference TE method, which is suitable for the tracking control for a DVD-ROM. When switching the tracking detection system, a learning step is required to adjust the amplitude and balance of tracking error signals, and extra time is also necessary for performing another tracking control after the switching. As a result, there is a problem in that extra time, as much as about 2 seconds, may be required before an optical disk reproduction.

It might also be conceivable to make a determination between a DVD-ROM and a DVD-R on the basis of a tracking error signal which is obtained while not performing tracking control. Since a DVD-ROM is formed with a pit depth corresponding to ¼ of the wavelength λ of a laser beam which is radiated for the sake of data reproduction, no push-pull TE is generated from a DVD-ROM. Therefore, if a push-pull TE with a sufficiently large amplitude is generated while not performing tracking control, it can be determined that the mounted disk is a DVD-R; on the contrary, if no push-pull TE is generated, it can be determined that the mounted disk is a DVD-ROM. In this case, since disk determination is made while not performing tracking control, it is possible to eliminate the extra time such as a learning step needed for tracking control.

However, under the BD (Blu-ray Disc) specifications, which defines a promising next-generation high-density optical disk, the pit depth of a record-only optical disk (BD-ROM) is not uniformly defined to be λ/4, so that a push-pull TE will also be generated from a BD-ROM. Therefore, it is difficult to rely on a push-pull TE to determine whether a mounted BD is record-only or not. Thus, BDs have a problem in that the rapid method which can be employed for DVDs cannot be used to correctly make a determination as to read-only or recordable.

The present invention has been made in order to solve the aforementioned problems, and an objective thereof is to provide an optical disk apparatus which makes an optical disk determination before commencing tracking, thus making it possible to reduce the amount of time until an optical disk reproduction.

Another objective of the present invention is to provide a method for performing an optical disk determination before commencing tracking.

Means for Solving the Problems

An optical disk apparatus according to the present invention is an optical disk apparatus for performing at least one of: recording data to a plurality of types of optical disks including a recordable optical disk and a read-only optical disk which are produced according to the BD specifications; and reproducing data from the optical disks, comprising: means for irradiating a management area of an optical disk with a light beam while not performing tracking control, and generating a track position signal from light which is reflected by the management area; means for irradiating the optical disk with a light beam, and generating an RF signal from light which is reflected by the optical disk; and disk determination means for determining, based on the track position signal or the RF signal obtained from the management area, whether the optical disk mounted in the optical disk apparatus is a recordable optical disk or a read-only optical disk.

In a preferred embodiment, the recordable optical disk is a BD-R or a BD-RE, and the read-only optical disk is a BD-ROM.

In a preferred embodiment, the management area is a PIC area.

In a preferred embodiment, the track position signal is a push-pull tracking error signal or a phase difference tracking error signal.

In a preferred embodiment, the disk determination means performs the determination based on a quality of the track position signal.

In a preferred embodiment, the quality of the track position signal is defined by a measured value of at least one of a modulation factor and a symmetry of the track position signal.

In a preferred embodiment, the disk determination means includes comparison means for comparing the measured value against a threshold value, and performs the determination in accordance with an output of the comparison means.

A preferred embodiment performs the determination based on whether or not a wobble signal is extractable from the push-pull tracking error signal.

A preferred embodiment, while not performing tracking control, irradiates a user area with a light beam, the user area being positioned outside the management area of the optical disk, and generates a track position signal from light reflected by the user area, and based on the track position signal obtained from the management area and the track position signal obtained from the user area, determines whether the optical disk mounted in the optical disk apparatus is a recordable optical disk or a read-only optical disk.

A preferred embodiment, based on a ratio of the track position signal obtained from the user area to the track position signal obtained from the management area, determines whether the optical disk mounted in the optical disk apparatus is a recordable optical disk or a read-only optical disk.

In a preferred embodiment, while not performing tracking control, the means for generating the track position signal irradiates with a light beam a border portion between the management area and a user area of the optical disk, the user area being positioned outside the management area; and based on the track position signal obtained from the management area and the track position signal obtained from the user area, it is determined whether the optical disk mounted in the optical disk apparatus is a recordable optical disk or a read-only optical disk.

A disk determination method according to the present invention is a disk determination method in an optical disk apparatus for performing at least one of: recording data to a plurality of types of optical disks including a recordable optical disk and a read-only optical disk which are produced according to the BD specifications; and reproducing data from the optical disks, the disk determination method comprising: a step of irradiating a management area of an optical disk with a light beam while not performing tracking control, and generating a track position signal from light which is reflected by the management area; and a step of determining, based on the track position signal obtained from the management area, whether the optical disk mounted in the optical disk apparatus is a recordable optical disk or a read-only optical disk.

Effects of the Invention

According to the present invention, based on a track position signal which is obtained from a management area of an optical disk, a determination between a read-only optical disk and a recordable optical disk can be made before commencing tracking control.

BRIEF DESCRIPTION OF DRAWINGS

[FIG. 12] (a) is a diagram showing the amplitude of a push-pull TE; and (b) is a diagram showing an summation signal.

DESCRIPTION OF THE REFERENCE NUMERALS

Figure 1:
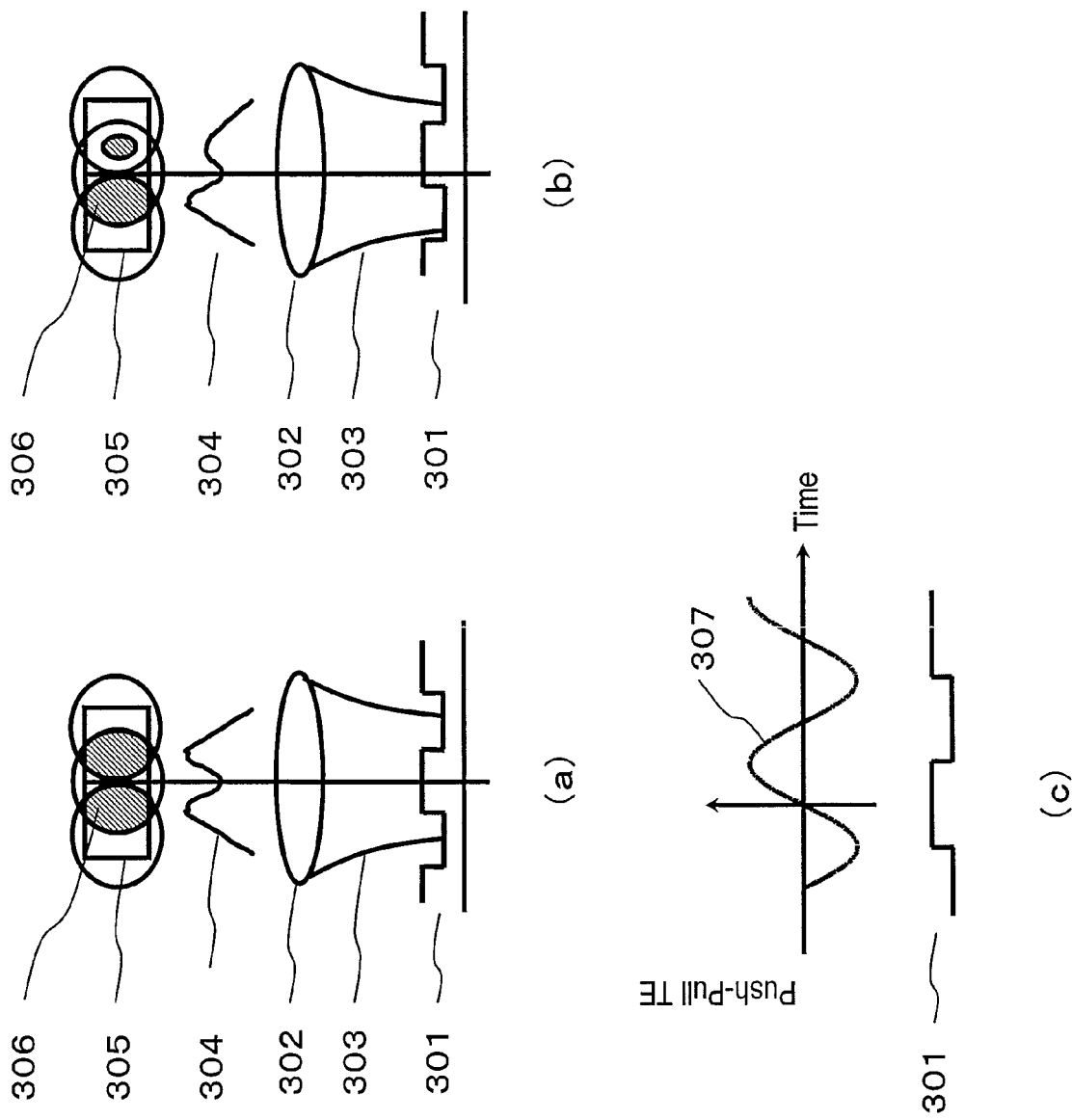
[FIG. 1] (a) to (c) are diagrams for illustrating a tracking error signal (push-pull TE) in the push-pull method.

| | |
|---|---|
| 101 | optical disk |
| 102 | light beam |
| 103 | light-receiving section |
| 104 | actuator |
| 105 | focus position detection circuit |
| 106 | tracking position detection circuit |
| 107 | actuator control means |
| 108 | motor |
| 109 | revolution detection means |
| 110 | motor control means |
| 111 | wobble signal extraction means |
| 112 | wobble period measurement means |
| 113 | reference clock period calculation means |
| 114 | comparison section |

-continued

| | |
|---|---|
| 201 | management area |
| 202 | guide groove |
| 203 | pits |
| 301 | optical disk |
| 302 | objective lens |
| 303 | light beam |
| 304 | reflected light intensity |
| 305 | photodiode |
| 306 | distribution of reflected light |
| 307 | push-pull TE |
| 401 | pit |
| 402 | light beam |
| 403 | distribution of reflected light |
| 404 | photodiode |
| 405 | arithmetic unit |
| 501 | optical disk |
| 502 | management area |
| 503 | objective lens |
| 504 | light beam |
| 505 | light-receiving section |
| 506 | push-pull TE detection circuit |
| 507 | phase difference TE detection circuit |
| 508 | RF detection circuit |
| 509 | amplitude/modulation factor measurement circuit |
| 510 | threshold value storing section |
| 511 | comparison section |
| 512 | stepper |
| 513 | initial light beam position |
| 514 | stepper pulse command |
| 707 | wobble signal extraction circuit |
| 710 | amplitude measurement circuit |
| 712 | first comparison section |
| 714 | first threshold value storing section |
| 716 | binarization circuit |
| 718 | period measurement section |
| 720 | second comparison section |
| 722 | second threshold value storing section |

BEST MODE FOR CARRYING OUT THE INVENTION

An optical disk apparatus according to the present invention supports a plurality of types of optical disks, including recordable optical disks and read-only optical disks which are produced according to the BD specifications. The inventors have paid attention to the fact that a "management area" of an optical disk which is produced according to the BD specifications has physical features different from those of a "user area", thus accomplishing the present invention. Specifically, the inventors have found that, due to the physical structures of the management areas of optical disks, it is possible based on a signal which is obtained from the management area to determine what cannot be determined based on a signal which is obtained from the user area, thus arriving at the concept of the present invention.

According to the present invention, when determining whether an optical disk that is mounted in the optical disk apparatus is a recordable optical disk or a read-only optical disk as mentioned above, the "management area" of the optical disk is irradiated with a light beam while not performing tracking control, thus generating a "track position signal" on the basis of a light beam which is reflected from the "management area", and makes the above determination based on a difference in the waveform or amplitude thereof. The details of the "management area" will be specifically described later.

Before describing the construction and operation of the optical disk apparatus of the present invention, the "track position signal" will be described. A track position signal is typically a "push-pull TE" or a "phase difference TE", and is a tracking error (TE) signal representing an offset of a light beam spot with respect to a target track on the optical disk.

First, a "push-pull TE" will be described with reference to FIG. 1(a) to FIG. 1(b).

FIG. 1(a) and FIG. 1(b) are cross-sectional views showing a light beam 303 being radiated on an optical disk 301 having a guide groove (groove) which is formed in a spiral shape or a sequence of pits (physical protrusions and depressions). The light beam 303 is being converged on the optical disk 301 by an objective lens 302. Via the objective lens 302, the light beam 303 having reflected from the optical disk 301 enters two-split photodiodes 305.

FIG. 1(a) shows a case where the light beam 303 is positioned at the center of an information track, and FIG. 1(b) shows a case where the light beam 303 is shifted from the center of the information track. FIG. 1(c) shows a waveform 307 of a push-pull TE which is defined by a difference (A-B) between outputs A and B of the two-split photodiodes 305.

FIGS. 1(a) and (b) each schematically show, in its upper portion, the reflected light beam 306 with which the two-split photodiodes 305 are irradiated. Since the light beam is diffracted at an edge of the guide groove or pit, an intensity distribution 304 of the reflected light beam has two peaks. The intensity distribution 304 is symmetric along the right-left direction in the example shown in FIG. 1(a), but asymmetric in the example shown in FIG. 1(b).

When the light beam 303 is positioned at the center of the guide groove or pit as shown in FIG. 1(a), the intensity distribution 304 of the reflected light beam is symmetric along the right-left direction, and therefore a distribution of reflected light 306 on the two-split photodiodes 305 is equally split between the respective diodes. On the other hand, when the light beam 303 is shifted from the center of the guide groove or pit as shown in FIG. 1(b), intensive light which is diffracted from the end of the guide groove or pit enters the photodiode 305 that is positioned on the shifted side. Conversely, the diffracted light which enters the photodiode 305 that is opposite to the shift direction becomes weak.

FIG. 1(c) shows a waveform 307 of a push-pull TE which is defined by a difference (A-B) between the outputs A and B of the two-split photodiodes 305. As described above, since the difference between the outputs of the two-split photodiodes 305 changes in accordance with the relative positions of the light beam 303 and the guide groove or pits, it is possible to detect the relative positions of the light beam 303 and the guide groove or pits on the basis of the waveform 307 of the push-pull TE.

In order to generate such a push-pull TE, the depth of the guide groove or pit is important. Assuming that the light beam has an effective wavelength of $\lambda$ [nm] and the guide groove or pit has a depth of d [nm], a strong push-pull TE can be generated when the depth d is set in a range from $\lambda/8$ to $\lambda/12$. On the other hand, if the depth d is $\lambda/4$, the push-pull TE becomes substantially zero.

Next, the "phase difference TE" will be described with reference to FIGS. 2(a) to (g).

Figure 2:
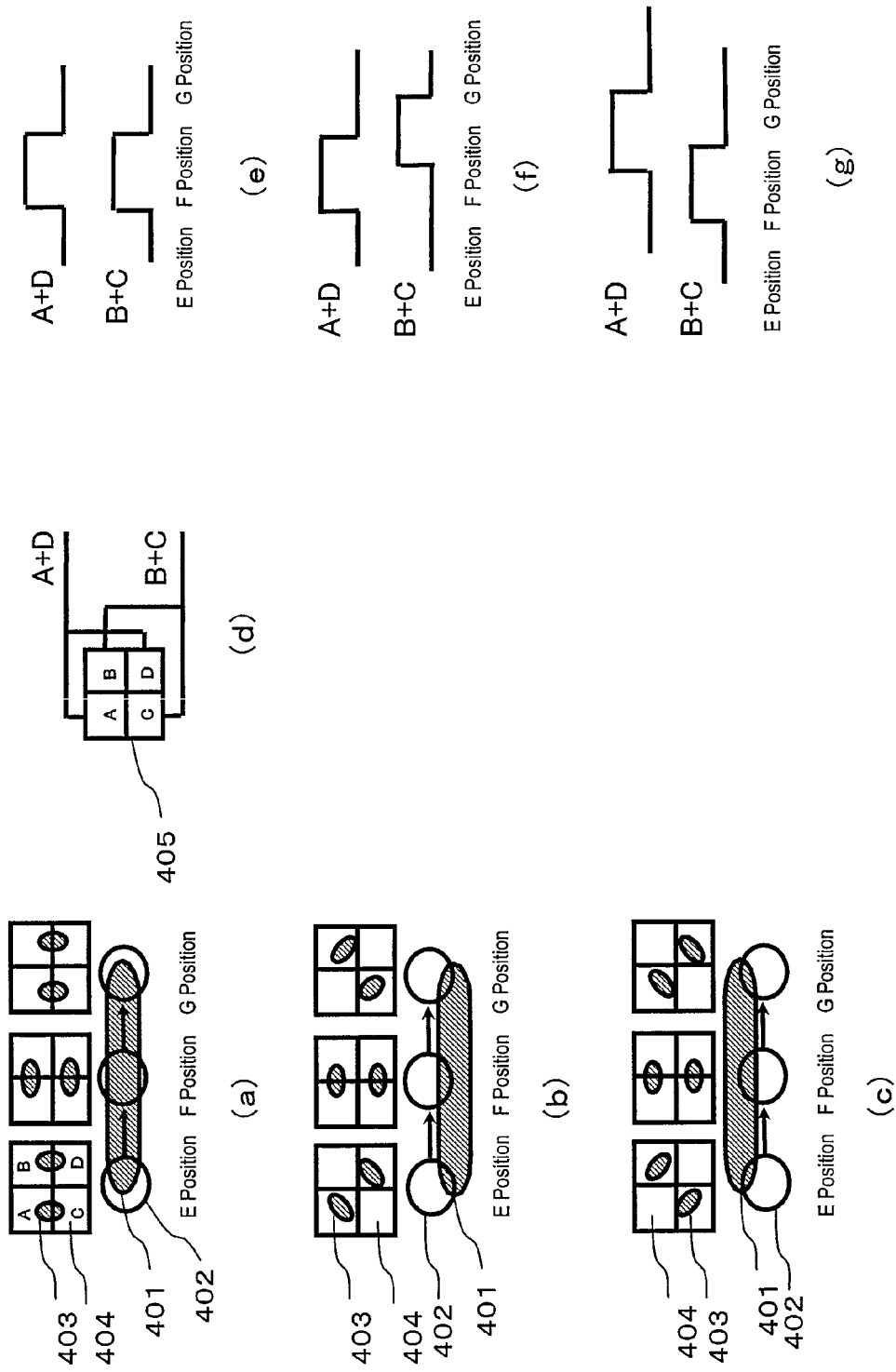
[FIG. 2] (a) to (g) are diagrams for illustrating a tracking error signal (phase difference TE) in the phase difference method.

In FIGS. 2(a) to (c), as the optical disk rotates, a light beam spot 402 is moving toward the right upon a pit 401. FIGS. 2(a) to (c) each show a distribution 403 of reflected light when a photodiode 404 which is split into four areas A, B, C, and D is irradiated with the light beam having been reflected from the optical disk.

FIG. 2(d) schematically shows the construction of an arithmetic unit 405 which, based on electrical signals which are output from the areas A, B, C, and D of the photodiode 404, calculates a signal A+D and a signal B+C. FIGS. 2(e), (f), and (g) show output waveforms of the arithmetic unit 405 when the light beam 402 passes over the center axis of the pit 401, and respectively correspond to the states of FIGS. 2(a), (b), and (c).

As shown in FIG. 2(a), when the light beam spot 402 passes through the center of the pit 401, the intensity change is identical in phase between the signal A+D and the signal B+C, as shown in FIG. 2(e). On the other hand, as shown in FIG. 2(b) or FIG. 2(c), when the light beam spot 402 passes along a position which is shifted from the center axis of the pit 401, as shown in FIG. 2(f) or FIG. 2(g), the intensity change has a phase difference between the signal A+D and the signal B+C. By detecting this phase difference, an offset of the light beam spot 402 with respect to the center axis of the pit 401 can be detected.

Note that, unlike a push-pull TE, a phase difference TE is of such a nature that it is maximized when the depth d of the pit is equal to $\lambda/4$.

Next, optical disks which are employed in preferred embodiments of the present invention and management areas thereof will be described.

Figure 3:
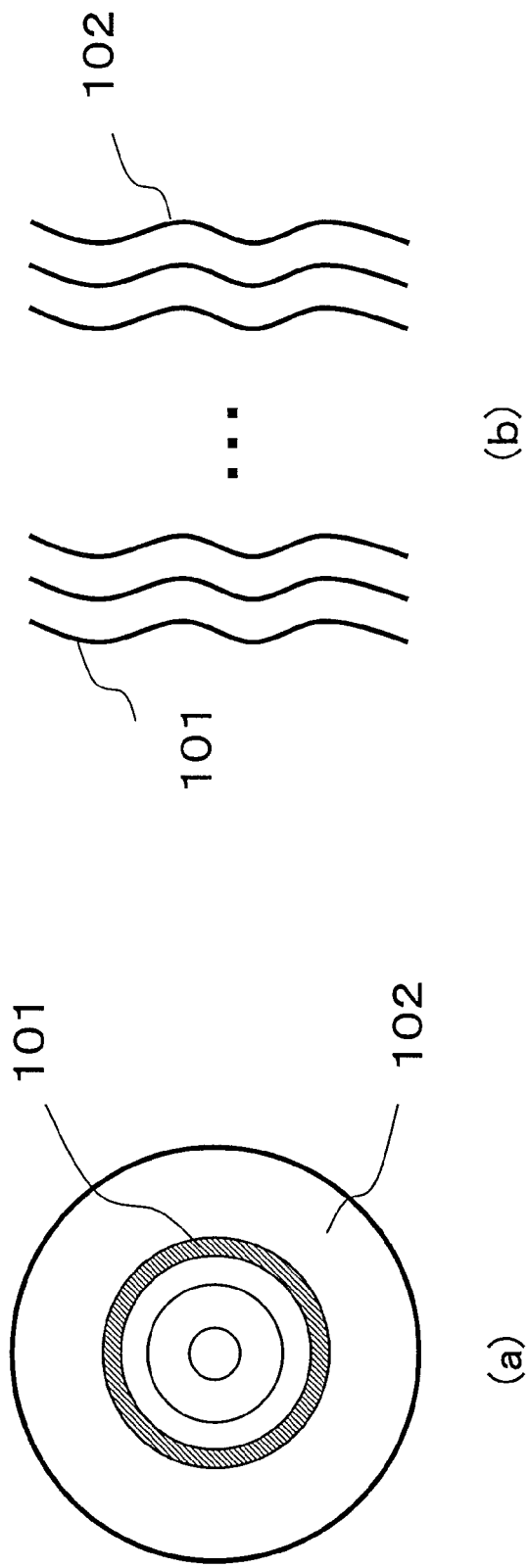
[FIG. 3] (a) is a plan view of a recordable optical disk; and (b) is a partially-enlarged view thereof.
Figure 4:
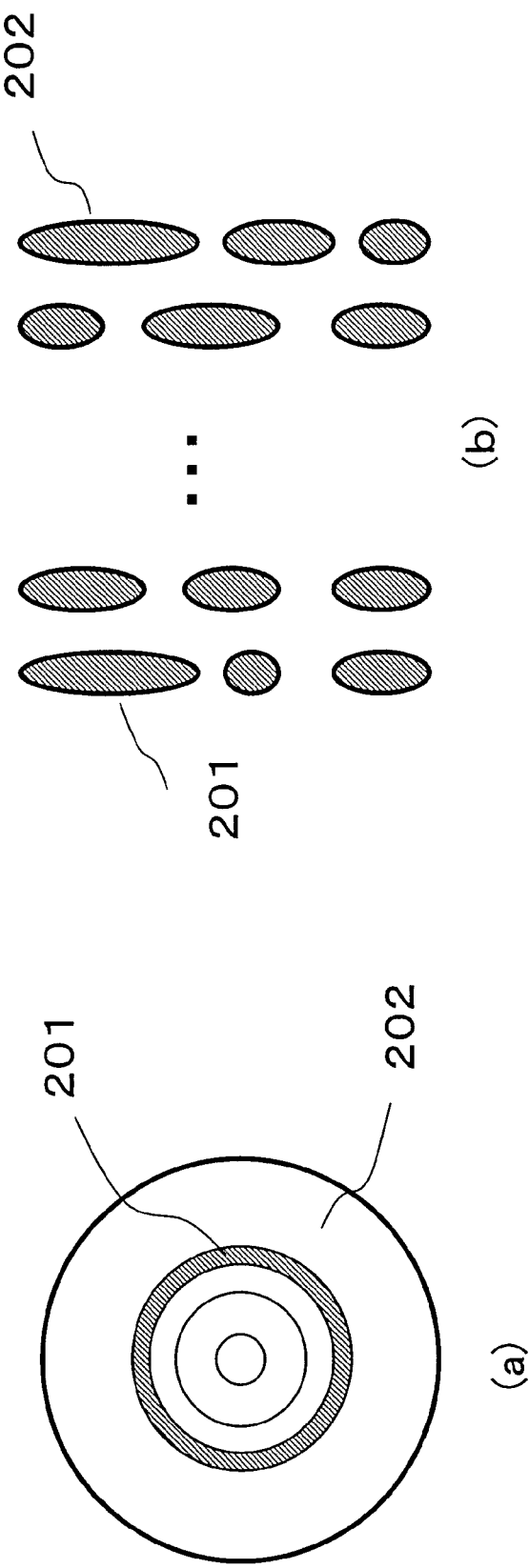
[FIG. 4] (a) is a plan view of a read-only optical disk; and (b) is a partially-enlarged view thereof.

First, FIG. 3 and FIG. 4 are referred to. FIG. 3(a) is a plan view of a recordable optical disk used in the present embodiment, and FIG. 3(b) is a partially-enlarged view thereof. On the other hand, FIG. 4(a) is a plan view of a read-only optical disk used in the present embodiment, and FIG. 4(b) is a partially-enlarged view thereof. The recordable optical disk in the present embodiment is a BD-RE (Blu-ray Disc Rewritable) or a BD-R, and the read-only optical disk is a BD-ROM.

On the recordable optical disk of FIG. 3, an information track which extends in a spiral shape from the disk's innermost periphery toward the outer periphery side is formed. Physically speaking, the information track is composed of a guide groove which is formed in the optical disk substrate. The guide groove has a wobble shape which undergoes periodic displacements along the disk radial direction. The waveform of the wobble shape is basically a "sine wave", but a combination of steep-displacement portions and gentle-displacement portions makes it possible to represent information or "1" or "0". By forming a sequence of wobble waveforms representing "1" or "0", a plurality of bits of information can be expressed. From reflected light which is obtained by irradiating such an information track with a light beam, a signal (wobble signal) which is in accordance with the wobble waveform can be detected.

Note that the recordable optical disk of FIG. 3 includes at least one information recording layer which is composed of a phase-changeable recording material, for example. By irradiating the information recording layer with a light beam of a predetermined power or more, the optical property (refractive index or reflectance) of the information recording layer can be locally changed. Thus, it becomes possible to form or erase a sequence of "recording marks" defining user data on or from the information recording layer.

The recordable optical disk shown includes, in addition to an area (user area) in which user data is to be recorded, a "management area" in which control data (management information) concerning each individual optical disk is recorded. According to the BD specifications, such a management area is positioned at the disk's innermost periphery side, and the user area is positioned on the disk's outer periphery side of the management area. The management area under the BD specifications is also referred to as a "PIC area", PIC being an abbreviation of "Permanent Information & Control data".

As shown in FIGS. 3(a) and (b), the information track 101 in the management area and the information track 102 in the user area both have a wobble shape, but a detectable difference exists between the two wobble shapes. Specifically, the information track 101 is wobbled so as to express management information, whereas the information track 102 is wobbled so as to express physical addresses on the optical disk.

According to the BD specifications, the information track 101 in the management area has a track pitch which is within a range of ±0.01 μm around 0.35 μm (i.e., 0.34 to 0.36 μm), whereas the information track 102 in the user area has a track pitch which is within a range of ±0.01 μm around 0.32 μm (i.e., 0.31 to 0.33 μm). The reason why the track pitch in the management area is designed to be broader than the track pitch in the user area, by as much as about 10%, is to increase the modulation factor of a push-pull TE which is obtained from the information track 101 in the management area in order to enable accurate acquisition of management information which is necessary for the recording/reproduction operation, thus improving the signal quality (CN of the wobble signal).

Now, the "modulation factor" of a push-pull TE is a value obtained by normalizing an amplitude PP (peak-to-peak value) of the push-pull TE shown in FIG. 12(a) by an "summation signal AS" shown in FIG. 12(b), i.e., "PP/AS". The summation signal AS is defined as a sum (A+B) of the outputs A and B of the two-split photodiodes shown in FIG. 1, for example. In the case where two-split photodiodes are adopted and their summation signal SA is expressed as (A+B), the modulation factor will be expressed as (A−B)/(A+B).

The modulation factor of the push-pull TE is sensitive to changes in the track pitch. Even if the track pitch of the information track 101 in the management area slightly increases (about 10%) over the track pitch of the information track 102 in the user area, the amplitude PP of the push-pull TE will increase by about 1.5 times, whereby the modulation factor will also increase by about 1.5 times.

An information recording layer also exists above the information track 101 in the management area as such. However, if any recording mark is formed in the information recording layer above the information track 101, such a mark will induce more errors in the wobble signal detection. Therefore, it is preferable not to form any recording marks in the management area.

Note that the user data is rewritable because it is recorded by forming "recording marks", i.e., local changes in the optical property of the information recording layer, as described above. On the other hand, the management information, which is defined by the wobble shape, is non-rewritable because it is fixed in the form of a wobble shape of the guide groove during the manufacture of the optical disk.

Next, referring to FIG. 4, the construction of the read-only optical disk will be described.

On the read-only optical disk of FIG. 4, information pits which extend in a spiral shape is formed. The information pits are composed of emboss pits which are formed in the substrate of the optical disk.

The read-only optical disk shown also has, in addition to an area where music or video data, etc., is recorded, a management area in which management information concerning each individual optical disk is recorded, the management area being at the disk's innermost periphery. As shown in FIG. 4, information pits 201 are formed in the management area, and information pits 202 are formed in the user area.

In a read-only optical disk such as a BD-ROM, the pit depth of the information pits 201 in the management area is set equal to the pit depth of the information pits 202 in the user area. Since physical protrusions and depressions (pits) are present in the management area of a BD-ROM, a "phase difference TE" can also be obtained from its management area. On the other hand, the management area of the recordable optical disk shown in FIG. 3 has no protrusion/depression pits or recording marks formed therein, and therefore a "phase difference TE" cannot be obtained from its management area. For similar reasons, although an "RF signal" can be obtained from the management area of a BD-ROM, an "RF signal" cannot be obtained from the management area of a BD-RE/R.

According to the BD specifications, the track pitch in a BD-ROM is also specified to be within a range similar to that of a BD-RE/R. In other words, the information pits 201 in the management area have a track pitch which is within a range of ±0.01 µm around 0.35 µm (i.e., 0.34 to 0.36 µm), whereas the information pits 202 in the user area have a track pitch which is within a range of ±0.01 µm around 0.32 µm (i.e., 0.31 to 0.33 µm).

Regardless of a recordable optical disk or a read-only optical disk, the management area is provided in a specific portion which is equidistant from the disk center. Specifically, an area spanning between a radius of 22.4 mm and a radius of 23.197 mm around the disk center is used as the management area.

The modulation factor of a push-pull TE which is obtained from the management area of a recordable optical disk (BD-RE/R) is greater than the modulation factor of a push-pull TE which is obtained from the management area of a read-only optical disk (BD-ROM). On the other hand, in a BD-ROM, the depth of pits is set to be about ¼ of the effective wavelength λ of the light beam, this being in order to maximize an RF signal which is obtained from the pits. Therefore, the phase difference TE which is obtained from a BD-ROM has an increased signal amplitude, and an increased modulation factor, whereas the push-pull TE has a relatively small amplitude and a reduced modulation factor.

The characteristics of various signals which are reproduced from the management area and the user area of a BD-ROM and a BD-RE/R are summarized in Table 1 and Table 2 below.

TABLE 1

| | management area | |
|---|---|---|
| | BD-ROM | BD-RE/R |
| push-pull TE | modulation factor: 0.1-0.525 | modulation factor: 0.26-0.52 |
| phase difference TE | output | not output (user data unrecorded) |

TABLE 2

| | user area | |
|---|---|---|
| | BD-ROM | BD-RE/R |
| push-pull TE | modulation factor: 0.1-0.35 | modulation factor: 0.21-0.45 |
| phase difference TE | output | unknown (depends on presence/absence of user data) |

The ranges of modulation factors indicated in Table 1 and Table 2 are defined under the BD specifications. From a comparison between Table 1 and Table 2, it is seen that the modulation factor of a push-pull TE which is obtained from the management area of a BD-RE/R is only slightly increased over the modulation factor of a push-pull TE which is obtained from the user area of the same BD-RE/R. However, in an actual BD-RE/R, the track pitch in the management area is broader than the track pitch in the user area and the signal intensity (amplitude PP) of the push-pull TE is increased, and therefore the modulation factor of the push-pull TE in the management area is increased to about 1.5 times that of the modulation factor of the push-pull TE in the user area, thus exhibiting a sufficiently larger value than the modulation factor of a push-pull TE which is obtained from a BD-ROM. Since the track pitch (pitch of a guide groove) of a BD-RE/R strongly affects the modulation factor, the track pitch of the management area of a BD-RE/R is set to be as large as possible within the specification range. In other words, in a BD-RE/R, the track pitch in the management area is set to 0.36 (=0.35+0.01) µm. On the other hand, in the user area, in order to provide as many tracks as possible, the track pitch is preferably set to a minimum within the specification range, i.e., 0.31 (=0.32−0.01) µm.

Note that, according to the BD specifications, the track pitch in the management area is made broader than the track pitch in the user area also in a BD-ROM. However, in terms of stability when performing tracking control, it is preferable, in an actual BD-ROM, to set the track pitch in the management area to be as close as possible to the track pitch in the user area. Therefore, in a BD-ROM, the track pitch in the management area is set to 0.34 (=0.35−0.01) µm, whereas the track pitch in the user area is set to 0.33 (=0.32+0.01) µm.

Moreover, no guide groove is formed in the management area of a BD-ROM, and the reason why a push-pull TE is generated at all is the diffraction by emboss pits. Therefore, in a BD-ROM, the modulation factor of a push-pull TE does not undergo much of an increase even if the track pitch in the management area is broadened.

For such design reasons, the modulation factor of a push-pull TE which is obtained from the management area of a BD-ROM becomes sufficiently smaller than the modulation factor of a push-pull TE which is obtained from the management area of a BD-RE/R.

Moreover, as for the phase difference TE, too, there is a difference between the management area and the user area of a BD-RE/R. This is because, when data is recorded in the user area, a sufficiently large phase difference TE is generated also from the user area, whereas no user data is written to the management area and therefore no significant phase difference TE is output.

Thus, based on a track position signal which is obtained from the "management information" of an optical disk that complies with the BD specifications, it is possible to determine with a high accuracy whether the mounted optical disk is a BD-ROM or a BD-RE/R. According to the present invention, by utilizing such characteristics of the management area, a determination between a read-only optical disk and a recordable optical disk is made based on a track position signal which is obtained from the management area.

Note that, even if the present invention is applied to an optical disk that complies with the DVD specifications, it would not become possible to make a determination between a DVD-ROM and a DVD-RAM. The reason is that, management information is recorded in the form of pits in both of the management areas of a DVD-ROM and a DVD-RAM, so that there will be no difference between the waveforms of track position signals therefrom. On the other hand, in a DVD-ROM, the pit depth is always set to λ/4, and therefore the modulation factor of a push-pull TE which is obtained from the user area of a DVD-ROM is substantially zero. Therefore, based on a push-pull TE which is obtained from the user area, it is still possible to determine whether a DVD is a DVD-ROM or not.

Hereinafter, preferred embodiments of the present invention will be described.

Embodiment 1

First, referring to FIG. 5, a first embodiment of the optical disk apparatus according to the present invention will be described.

When either one of a recordable optical disk and a read-only optical disk having the characteristics of Table 1 is mounted, the optical disk apparatus of the present embodiment is able to determine whether the optical disk is recordable or read-only.

Figure 5:
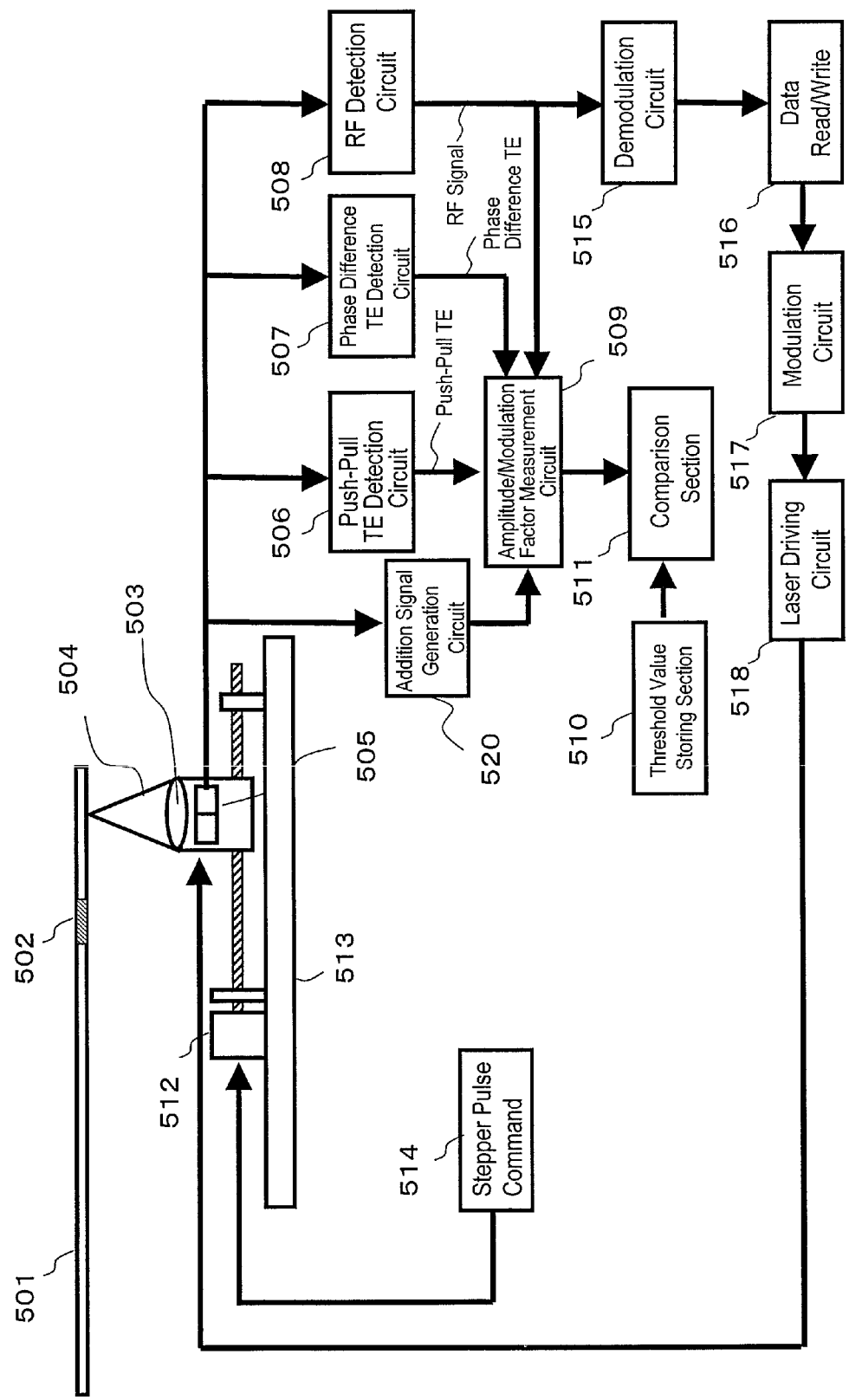
[FIG. 5] A construction diagram showing an optical disk apparatus according to Embodiment 1 of the present invention.

FIG. 5 shows an optical disk 501 which is mounted in the optical disk apparatus of the present embodiment. A management area 502 is provided in a specific position of the optical disk 501. Various management information concerning this optical disk is recorded in the management area 502.

The optical disk apparatus of the present embodiment includes: an objective lens 503 which converges a light beam 504 onto the optical disk 501; a light-receiving section 505 which receives reflected light from the optical disk 501 and converts it into an electrical signal; and a stepper 512 which moves an optical pickup (not shown) having the objective lens 503 and the light-receiving section 505 along a radial direction of the optical disk 501.

The optical pickup has a known construction, and comprises a light source (semiconductor laser) for emitting the light beam 504, as well as other optical elements. In the present embodiment, in order to enable reproduction of data from a read-only optical disk (BD-ROM) and a recordable optical disk (BD-RE/R) that comply with the BD specifications, a blue semiconductor laser is comprised as the light source, and thus a blue light beam 504 can be emitted. In order to also support data recording/reproduction for a DVD and a CD, a light source for emitting a red light beam or an infrared light beam with which to irradiate optical disks complying with such specifications may also be comprised.

The stepper 512 moves the optical pickup in response to a stepper pulse command 514, thus being above to move the irradiated position of the light beam 504 upon the optical disk 501 along the disk radial direction.

The initial light beam position 513 shown is the basis for an absolute position of the light beam 504. When the optical disk 1 is mounted, and a disk determination operation is begun, the stepper 512 is operated so that the optical pickup moves from a retracted position toward the innermost periphery of the optical disk 501. At this time, the optical pickup will once move to the initial light beam position 513.

The optical disk apparatus of the present embodiment further comprises: a push-pull TE detection circuit 506 for detecting an offset between the light beam 504 and a guide groove of the optical disk 501 based on an electrical signal which is output from the light-receiving section 505; a phase difference TE detection circuit 507 for detecting an offset between the light beam 504 and pits of the optical disk 501 based on an electrical signal which is output from the light-receiving section 505; and an RF detection circuit 508 for detecting an intensity change of the reflected light, which varies due to a pit or a recording mark, from the output of the light-receiving section 505. Furthermore, it comprises: an amplitude/modulation factor measurement circuit 509 for measuring the amplitude or modulation factor of signals which are output from the push-pull TE detection circuit 506, the phase difference TE circuit 507, and the RF detection circuit 508; an summation signal generation circuit 520 for generating an summation signal which is necessary for the measurement of the modulation factor; a threshold value storing section 510 for retaining a threshold value to be compared against the measured amplitude or modulation factor; and a comparison section 511 for making a comparison between the output of the threshold value storing section 510 and the output of the amplitude/modulation factor measurement circuit 509.

Note that, in a data reproduction mode, the output of the RF detection circuit 508 is also input to a demodulation circuit 515, and decoded. The output of the demodulation circuit 515 is output as a reproduction signal via a data read/write section 516. On the other hand, in a data recording mode, the read/write circuit 516 sends externally-received user data to a modulation circuit 517. The modulation circuit 517 encodes the user data. The output of the modulation circuit 517 is sent to a laser driving circuit 518, which drives the light source (semiconductor laser) within the optical pickup based on the encoded user data. The intensity of the light beam which is emitted from the semiconductor laser varies in accordance with the output of the laser driving circuit 518, whereby user data is recorded in the user data area of the optical disk 501. Note that the recording/reproduction of use r data is to be performed after completing an operation to determine the type of the optical disk 501 and reading management information from the management area 502.

Next, referring to the flowchart of FIG. 6 in addition to FIG. 5, a disk determination method according to the present embodiment will be described.

First, a method of determination which utilizes a push-pull TE will be described.

Figure 6:
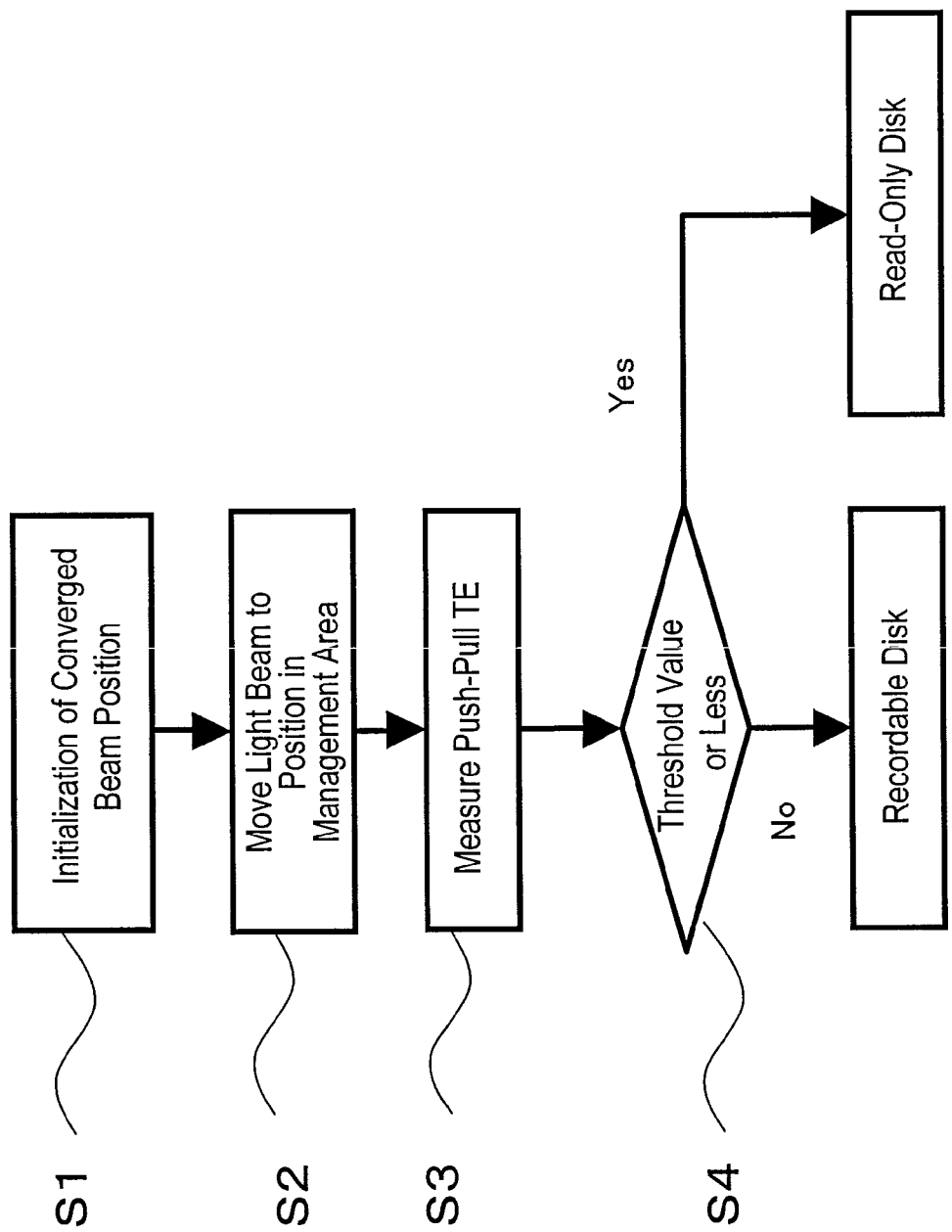
[FIG. 6] A flowchart showing a procedure of optical disk determination according to Embodiment 1 of the present invention.

When the optical disk 501 of FIG. 5 is mounted to the optical disk apparatus, at step S1 in FIG. 6, in order to determine a basis for the absolute position of the light beam 504, the stepper 512 is driven so as to move the light beam 504 to the initial light beam position 513 (initialization of the converged beam position).

Next, at step S2, the light beam 504 is moved to an intermediate position in the management area 502. Specifically, a number of pulses which will allow the irradiated position of the light beam 504 to move to an intermediate position in the management area 502 are sent from the stepper pulse command 514 to the stepper 512, thus driving the stepper 512. At this time, the converged position of the light beam 504 will move at least about 5 mm toward the disk's outer periphery side. Since the position of the management area 502 upon the optical disk 501 is the same regardless of read-only or recordable, the optical pickup can be moved to a position which enables irradiation of the management area 502, regardless of which optical disk is mounted. Note that the management area 502 has a width of about 0.8 mm along the disk radial direction, this width being sufficiently larger than the positioning accuracy of the stepper 512. Therefore, there is little possibility of inadvertently irradiating any area outside the management area 502 (e.g., the user area) with the light beam 504.

At step S3, the management area 502 of the optical disk 501 is irradiated with the light beam 504, and reflected light from the management area 502 is converted by the light-receiving section 505 into an electrical signal. The push-pull TE detection circuit 506 generates a push-pull TE from the output of the light-receiving section 505, and thus the modulation factor of the push-pull TE is measured by the amplitude/modulation factor measurement circuit 509. At this time, tracking control is not being performed, although focus control is being performed.

At step S4, a comparison is made between the output of the amplitude/modulation factor measurement circuit 509 and the output of the threshold value storing section 510. The threshold value storing section 510 retains in advance a value between the modulation factor of a push-pull TE from the management area 502 of a read-only optical disk and the modulation factor of a push-pull TE from the management area 502 of a recordable optical disk.

For the aforementioned reason, the track pitches in the management areas of a BD-RE/R and a BD-ROM are preferably set to 0.36 μm and 0.34 μm, respectively. Although the specification ranges of modulation factors shown in Table 1 have some overlap between the BD-RE/R and the BD-ROM, the actual optical disks have different track pitches, and the modulation factor depends strongly on the track pitch. Therefore, it is often the case that the modulation factor of a push-pull TE obtained from the management area of a BD-ROM takes a value near the lowest level (e.g., 0.1) within the range of Table 1, and that the modulation factor of a push-pull TE obtained from the management area of a BD-RE/R takes a value near the highest level (e.g., 0.52) within the range of Table 1. Therefore, by setting the threshold value at about 0.3, it becomes possible to distinguish between a BD-ROM and a BD-RE/R, based on the modulation factor of the push-pull TE.

As shown in Table 1, a push-pull TE from a read-only optical disk has a low modulation factor, so that the amplitude/modulation factor measurement circuit 509 will produce a small output, whose value is smaller than the threshold value. On the other hand, a push-pull TE from a recordable optical disk has a high modulation factor, so that the amplitude/modulation factor measurement circuit 509 will produce a large output, whose value is higher than the threshold value. As a result, if the modulation factor of the push-pull TE is equal to or less than the threshold value, the optical disk 501 can be determined as a read-only disk; and if the modulation factor of the push-pull TE is not equal to or less than the threshold value, the optical disk 501 can be determined as a recordable disk.

Thus, the present embodiment enables determination between a read-only optical disk and a recordable optical disk by utilizing a difference in the modulation factors of push-pull TE's which are obtained from the management area 502.

Although a difference in the modulation factors of push-pull TE's is utilized in the above example, determination between a read-only optical disk and a recordable optical disk is similarly possible by utilizing a difference in the symmetry of push-pull TE's.

Hereinafter, a method of determination which utilizes a phase difference TE will be described.

In this case, too, as in steps S1 and S2 shown in FIG. 6, the management area 502 of the optical disk 501 is irradiated with a light beam 504. However, a phase difference TE which the phase difference TE detection circuit 507 produces from the output of the light-receiving section 505 is used. Specifically, the phase difference TE is input from the phase difference TE detection circuit 507 to the amplitude/modulation factor measurement circuit 509, and the amplitude of the phase difference TE is measured. Then, a comparison is made between the output (measured amplitude value) of the amplitude/modulation factor measurement circuit 509 and the output of the threshold value storing section 510. The threshold value storing section 510 retains in advance a value (threshold value) between the amplitude of a phase difference TE from the aforementioned management area 502 of a read-only optical disk and the amplitude of a phase difference TE from the management area 502 of a recordable optical disk.

As described earlier, no guide groove exists in the management area of a BD-ROM (FIG. 4), but information is recorded in the form of pits, and therefore a phase difference TE having a large amplitude which exceeds the preselected threshold value is output. On the other hand, no pits or recording marks exist in the management area of a BD-RE/R, and therefore no phase difference TE is output.

Thus, also by utilizing a difference in the output power of phase difference TE's obtained from the management area 502 of the optical disk 501, it is possible to make a determination between a read-only optical disk and a recordable optical disk.

Note that, similarly to amplitudes of phase difference TE's, a difference in the symmetry of phase difference TE's can also be utilized to make a determination between a read-only optical disk and a recordable optical disk. Moreover, instead of using a phase difference TE, an RF signal can be used to make a determination between a read-only optical disk and a recordable optical disk, in a manner similar to using a phase difference TE. The reason is that an RF signal also shows a large amplitude in the presence of pits or recording marks, as does a phase difference TE.

Embodiment 2

As described earlier, pits are formed in the management area of a BD-ROM, and therefore an RF signal can be reproduced from the management area of a BD-ROM. However, no pits or recording marks are formed in the management area of a BD-RE/R, and therefore no RF signal can be reproduced from the management area of a BD-RE/R.

On the other hand, a wobbling guide groove is formed in the management area of a BD-RE/R, and therefore a wobble signal can be reproduced from the management area of a BD-RE/R. However, no wobbling guide groove exists in the management area of a BD-ROM, and therefore no wobble signal can be reproduced from the management area of a BD-ROM.

The characteristics of various signals which are reproduced from the management area and the user area of a BD-ROM and a BD-RE/R are summarized in Table 3 and Table 4 below.

TABLE 3

| | management area | |
|---|---|---|
| | BD-ROM | BD-RE/R |
| wobble signal | not output | not output |
| RE signal | output | not output (user data unrecorded) |

TABLE 4

| | user area | |
|---|---|---|
| | BD-ROM | BD-RE/R |
| wobble signal | not output | output |
| RE signal | output | unknown (depends on presence/absence of user data) |

From a comparison between Table 3 and Table 4, it is seen that no wobble signal can be reproduced from the management area or the user area of a BD-ROM, but a wobble signal can be reproduced from either the management area or the user area of a BD-RE/R. Therefore, it would be possible to make a disk determination between a BD-ROM or a BD-RE/R based on the presence/absence of a wobble signal being reproduced. However, if tracking control is performed in order to reproduce a wobble signal, the problems which have been described with respect to the conventional techniques will occur. Therefore, the inventors have paid attention to the fact that a push-pull TE which is obtained while not performing tracking control has a wobble signal superposed thereon, which is ascribable to the wobble of a guide groove. In the present embodiment, the above disk determination is performed based on whether a wobble signal is extractable from a push-pull TE or not.

Figure 13:
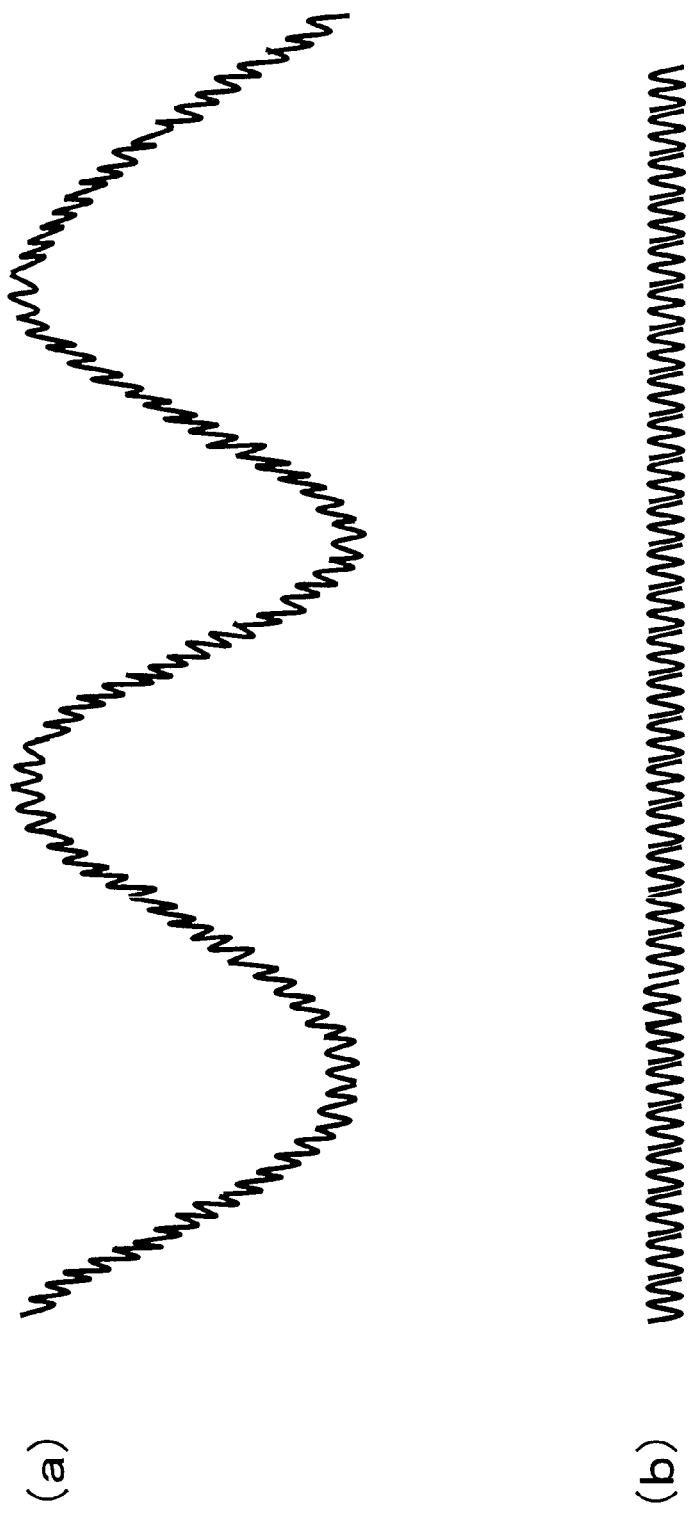
[FIG. 13] (a) is a diagram showing the waveform of a push-pull TE which is obtained from a BD-RE/R; and (b) is a diagram showing the waveform of a wobble signal which is extracted from the push-pull TE of (a).
Figure 14:
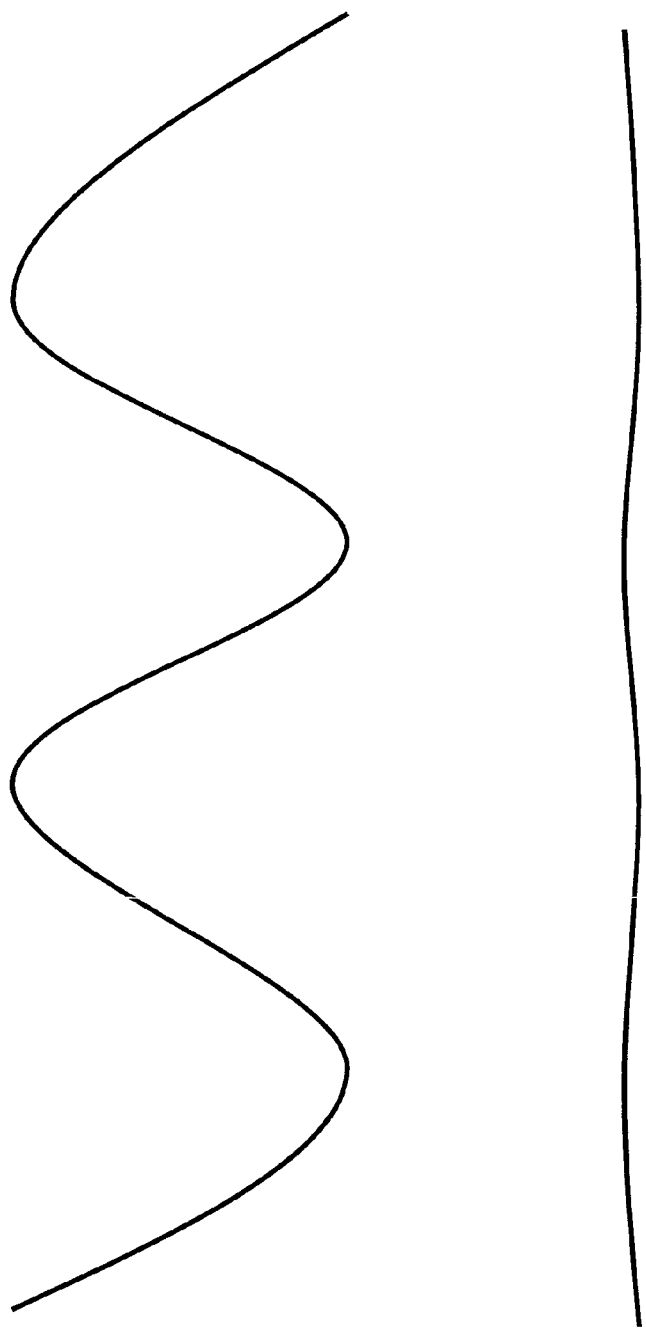
[FIG. 14] (a) is a diagram showing the waveform of a push-pull TE which is obtained from a BD-ROM; and (b) is a diagram showing that no wobble signal is obtained from a BD-ROM.

FIG. 13(a) shows the waveform of a push-pull TE which is obtained from a BD-RE/R, and FIG. 14(a) shows the waveform of a push-pull TE which is obtained from a BD-ROM. As can be seen from FIG. 13(a), a push-pull TE which is obtained from a BD-RE/R has a high-frequency component (wobble signal) superposed thereon, which is ascribable to the wobble of a guide groove. By subjecting it to an appropriate filter, it becomes possible to extract a wobble signal from the push-pull TE. FIG. 13(b) shows the waveform of a wobble signal which is extracted from the push-pull TE of FIG. 13(a). No such wobble signal is extractable from a push-pull TE from a BD-ROM (FIG. 14(b)).

Thus, if a wobbling guide groove is provided on an optical disk, a wobble signal will be superposed on the push-pull TE, as described above. However, if user data were recorded on the guide groove, fluctuations in amplitude (RF signal) that are ascribable to recording marks of the user data would also be superposed on the push-pull TE. Since the frequency band of the RF signal is close to the frequency band of the push-pull signal, it would be difficult to separate them. As can be seen from a comparison between Table 3 and Table 4, an RF signal can also be produced from the user area of a BD-RE/R as well. Superposition of such an RF signal would hinder extraction of a wobble signal from a push-pull TE.

However, as shown in Table 3, no user data will be recorded in the management area of a BD-RE/R, and no RF signal will be superposed on the push-pull TE. Moreover, since the track pitch in the management area is broadened relative to the track pitch in the user area, the modulation factor of the wobble signal is also relatively large. Therefore, based on a push-pull TE which is obtained from the management area, a wobble signal can easily be extracted, and a highly precise disk determination can be performed based on the presence/absence of such an extraction.

Figure 7A:
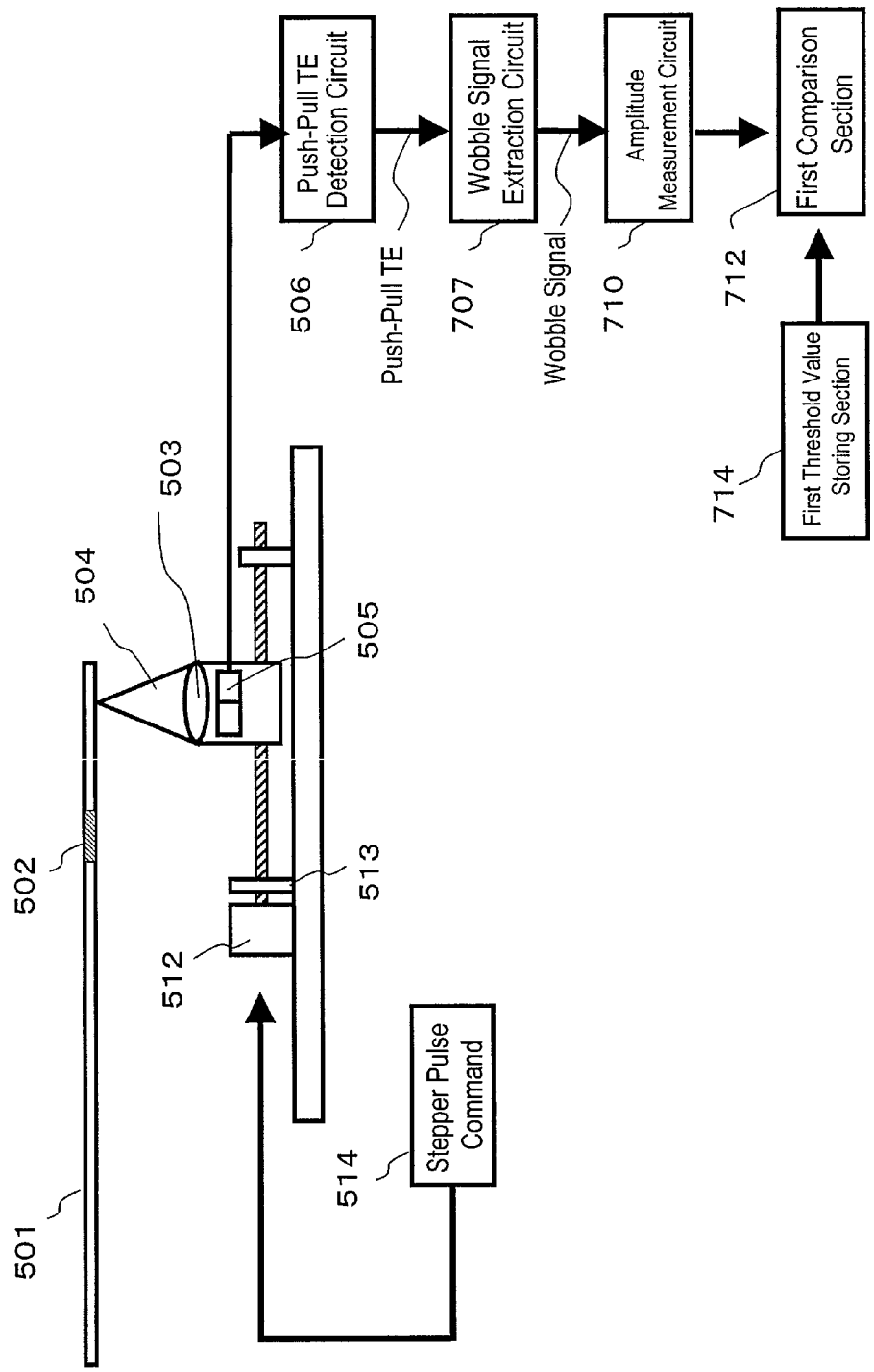
[FIG. 7A] A construction diagram showing an optical disk apparatus according to Embodiment 2 of the present invention.

Hereinafter, an optical disk apparatus according to the present embodiment will be described with reference to FIG. 7A. FIG. 7A shows the construction of a second embodiment of the optical disk apparatus according to the present invention.

The optical disk apparatus of the present embodiment has a similar construction to the construction of the optical disk apparatus of Embodiment 1, except that a wobble signal extraction circuit 707, an amplitude measurement circuit 710, a first comparison section 712, and a first threshold value storing section 714 are comprised. Therefore, any portion which is identical to the construction that has been described with respect to the optical disk apparatus of Embodiment 1 will not be redundantly described herein.

While not performing tracking control, the wobble signal extraction circuit 707 according to the present embodiment receives a push-pull TE which is output from the push-pull TE detection circuit 506, and extracts a wobble signal from the push-pull TE. The wobble signal is a signal having a predetermined frequency or phase that is contained in the wobble waveform of a guide groove of the optical disk 501. While not performing tracking control, a component that fluctuates with the wobble of the guide groove is superposed on the amplitude of the push-pull TE, and thus a wobble signal can be extracted from the push-pull TE.

The wobble signal extraction circuit 707 includes a band-pass filter (BPF), and is able to remove a signal component having a frequency which is sufficiently lower than the wobble frequency and a signal component having a frequency which is sufficiently higher than the wobble frequency. A push-pull TE which is obtained while not performing tracking control has a signal waveform such that a wobble signal having a relatively high frequency (e.g., about 500 kHz) is superposed on a high-frequency signal having a relatively low frequency (e.g., 5 kHz) which occurs when a light beam travels across a track with the rotation of the optical disk. Therefore, if the passband of the band-pass filter in the wobble signal extraction circuit 707 is set in a range that includes the wobble frequency, a wobble signal can be properly extracted from the push-pull TE.

A wobble signal which has been thus extracted is input to the amplitude measurement circuit 710. The amplitude of the wobble signal as measured by the amplitude measurement circuit 710 is compared, by the first comparison section 712, against a threshold value which is stored in the first threshold value storing section 714. If a wobble signal having a larger amplitude than this threshold value is detected, it is clear that the optical disk 501 has a wobbling guide groove, and thus the optical disk 501 can be determined as a BD-RE/R. On the other hand, if a signal which has a smaller amplitude than the threshold value is detected, it is clear that no wobble signal that is ascribable to a guide groove has been detected. In this case, the optical disk 501 can be determined as a BD-ROM.

Thus, according to the present embodiment, disk determination is made based on whether or not a wobble signal can be detected from a push-pull TE which is obtained while not performing tracking control. Therefore, a rapid disk determination is possible.

Figure 7B:
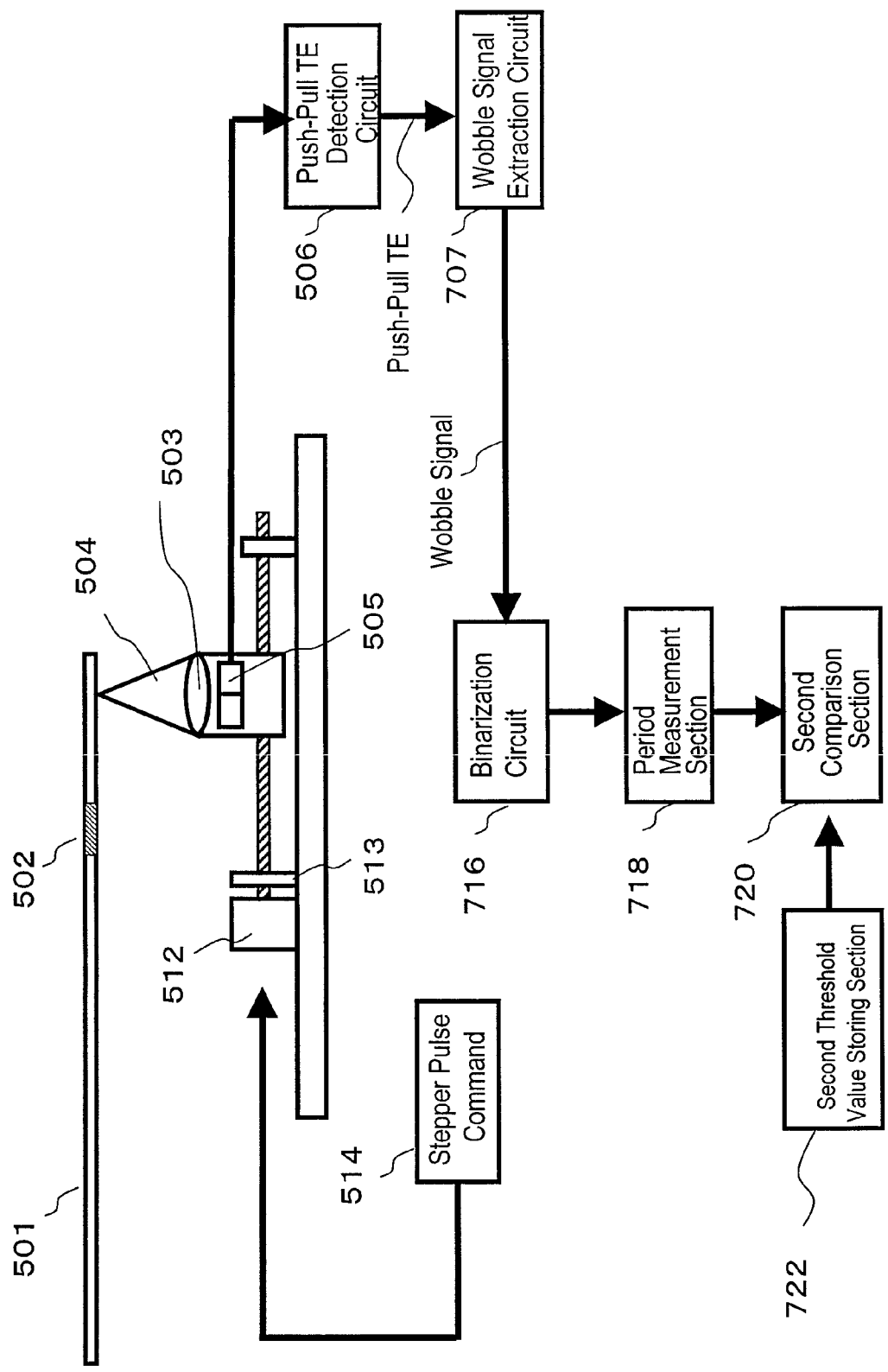
[FIG. 7B] A diagram showing another exemplary construction of the optical disk apparatus according to Embodiment 2 of the present invention.

Instead of performing disk determination by determining the presence/absence of an extracted wobble signal based on the size of signal amplitude, the presence/absence of an extracted wobble signal may be determined based on the signal frequency. FIG. 7B shows another exemplary construction of the optical disk apparatus according to the present embodiment. This optical disk apparatus differs from the optical disk apparatus shown in FIG. 7A in that a binarization circuit 716, a period measurement section 718, a second comparison section 722, and a second threshold value storing section 720 are comprised.

In the optical disk apparatus of FIG. 7B, after a wobble signal is input to the binarization circuit 716, a signal period measurement is performed in the period measurement section 718. The obtained period is compared, by the second comparison section 720, against a threshold value which is stored in the second threshold value storing section 722.

Next, referring to the flowchart of FIG. 8, a disk determination method according to the present embodiment will be described.

Figure 8:
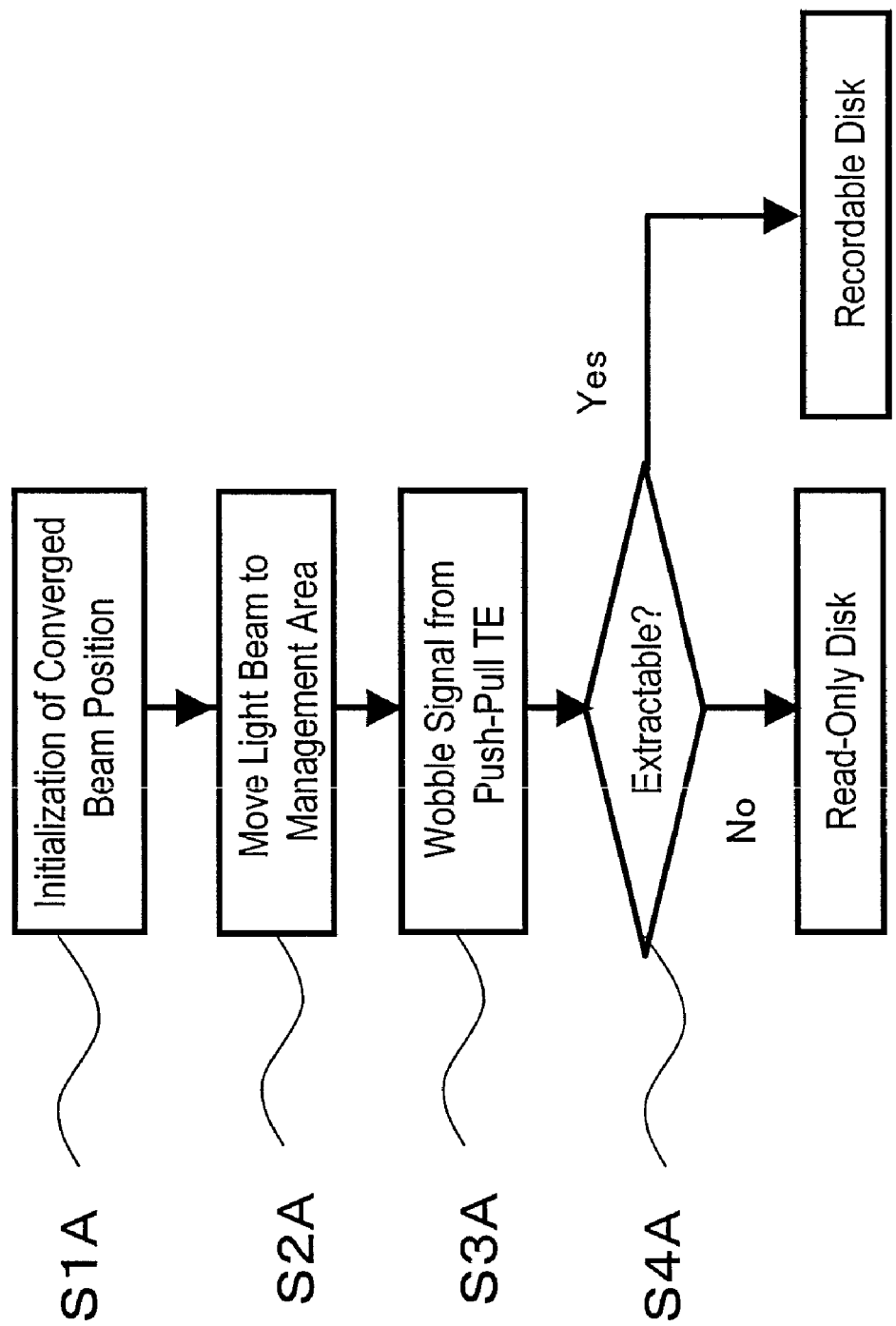
[FIG. 8] A flowchart showing a procedure of optical disk determination according to Embodiment 2 of the present invention.

When the optical disk 501 is mounted to the optical disk apparatus as shown in FIG. 7, at step S1A in FIG. 8, in order to determine a basis for the absolute position for the light beam 504, the stepper 512 is driven so as to move the light beam 504 to the initial light beam position 513 (initialization of converged beam position).

Next, at step S2A, the light beam 504 is moved to an intermediate position in the management area 502. Specifically, a number of pulses which will allow the irradiated position of the light beam 504 to move to an intermediate position in the management area 502 are sent from the stepper pulse command 514 to the stepper 512, thus driving the stepper 512.

At step S3A, the management area 502 of the optical disk 501 is irradiated with the light beam 502, and reflected light from the management area 502 is converted by the light-receiving section 505 into an electrical signal. The push-pull TE detection circuit 506 generates a push-pull TE from the output of the light-receiving section 505. The wobble signal extraction circuit 707 extracts a wobble signal from the push-pull TE.

The optical disk information in the management area 502 of a read-only optical disk is recorded in the form of pits, and no guide groove that wobbles with a predetermined frequency or phase exists. Therefore, if the mounted optical disk 501 is a read-only optical disk, no wobble signal is extracted.

On the other hand, a guide groove that wobbles with a predetermined frequency and phase exists in the management area 502 of a recordable optical disk, and thus a wobble signal can be extracted.

Thus, at step S4A, if a wobble signal is extracted and an amplitude which is equal to or greater than the threshold value or a frequency of an appropriate band is measured, the mounted disk is determined as a recordable optical disk. If it is determined that no wobble signal was extracted, it is determined as a read-only optical disk.

Thus, in the present embodiment, determination between a read-only optical disk and a recordable optical disk is made based on whether a wobble signal is extractable from a push-pull TE from the management area 502 or not.

In the present embodiment, disk determination is made based on whether or not a wobble signal is extractable from a push-pull TE which is obtained while not performing tracking control. As a result, the time required for a learning of tracking control and the like can be eliminated.

Note that, as described above, in order to extract a wobble signal from a push-pull TE which is obtained while not performing tracking control, it is necessary to subject the push-pull TE to a band-pass filter, which makes it difficult to obtain a wobble signal having a sufficiently large amplitude. Table 5 below shows ratios of the wobble amplitude to the amplitude of the push-pull TE (wobble amplitude/push-pull TE amplitude), with respect to a BD-RE and a DVD-R (comparative example).

TABLE 5

|  | user area | management area |
| --- | --- | --- |
| DVD-R | 0.08-014 | 0.08-0.14 |
| BD-RE/R | 0.2-0.55 | 0.3-0.6 |

As can be seen from Table 5, a DVD-R has a small "wobble amplitude/push-pull TE amplitude" ratio, and therefore it may be very difficult to extract a wobble signal from a push-pull TE in some cases. Therefore, in the case of DVDs, it is necessary to specially provide a band-pass filter of a higher-order ($5^{th}$ order or higher) in order to extract a wobble signal from a push-pull TE. On the other hand, in the case of a BD-RE/R, a sufficiently high "wobble amplitude/push-pull TE amplitude" ratio is obtained from the management area, and therefore a wobble signal can be extracted without specially providing a higher-order band-pass filter.

Thus, on a push-pull TE which is obtained from the management area of a BD-RE/R, a wobble signal having a large amplitude as compared to that in the user area is superposed. Moreover, no RF signal will be mixed thereto, as described above. Therefore, according to the present embodiment, it is possible to effectively perform disk determination between a BD-ROM and a BD-RE/R, based on a push-pull TE.

Embodiment 3

Figure 9:
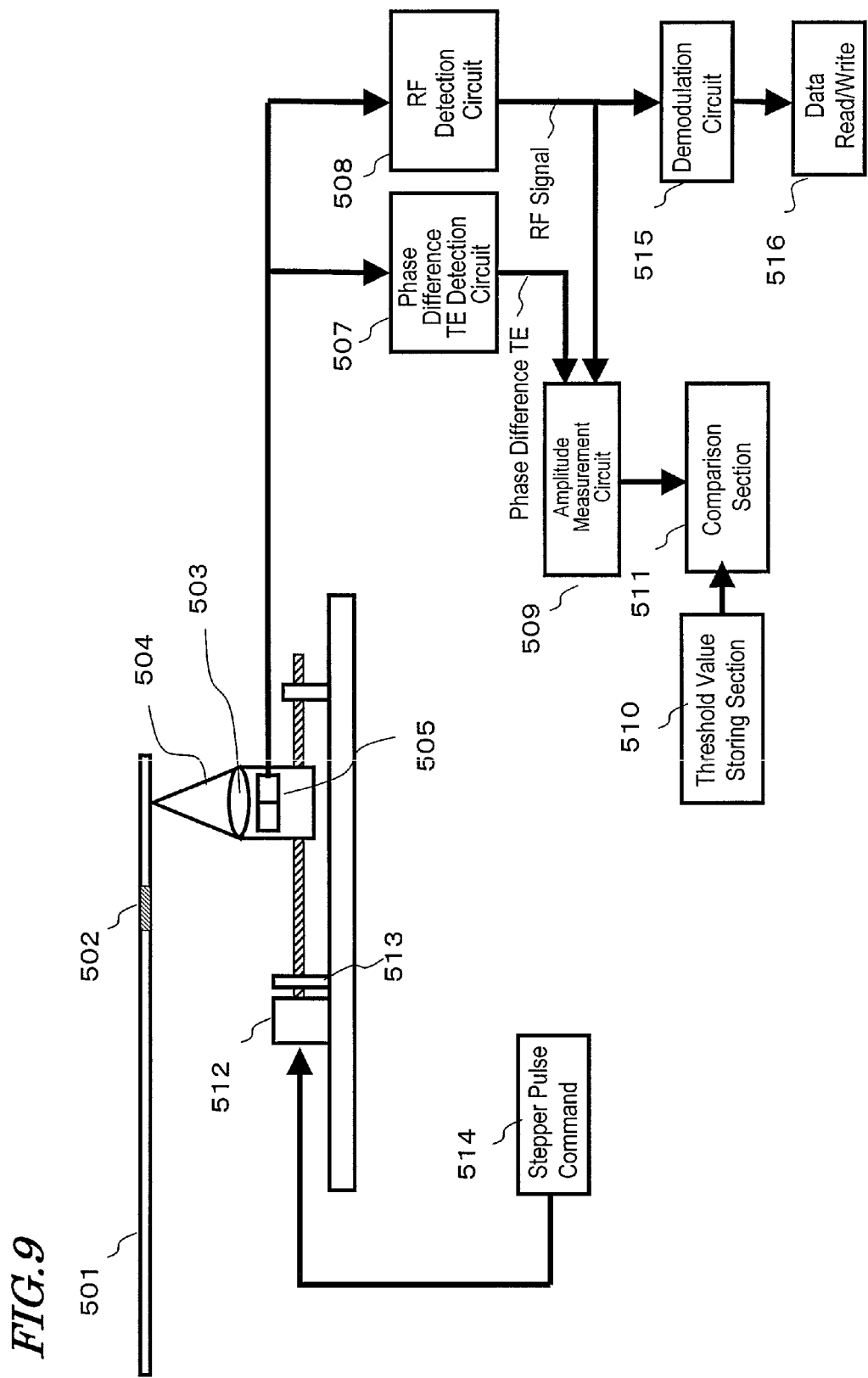
[FIG. 9] A construction diagram showing an optical disk apparatus according to Embodiment 3 of the present invention.

FIG. 9 is a diagram showing the construction of a third embodiment of the optical disk apparatus according to the present invention. The optical disk apparatus of the present embodiment is a read-only player, and is manufactured with the intention of having a read-only optical disk such as a BD-ROM mounted thereon. Therefore, the present embodiment lacks the push-pull TE detection circuit 506 shown in FIG. 5 and any constituent elements that are necessary for recording of user data.

The optical disk apparatus of the present embodiment includes a phase difference TE detection circuit 507 that generates a phase difference TE, which is an optimum track position signal for the tracking control of a read-only optical disk, thus being able to generate a phase difference TE from the management area of the optical disk 501 and determine whether the optical disk 501 is a BD-ROM or an inadvertently-mounted BD-RE/R. This determination method is as described with respect to Embodiment 1.

With the read-only optical disk apparatus shown in FIG. 9, it is possible, by using the phase difference TE system component parts comprised in a usual read-only player, to determine whether a mounted BD is read-only or recordable in a short time.

Embodiment 4

As described earlier, the "modulation factor" of a push-pull TE is a value obtained by normalizing an amplitude PP (peak-to-peak value) of the push-pull TE by an "summation signal AS" as shown in FIG. 12(b). This summation signal AS depends greatly on the reflectance which is exhibited by the information recording layer of the optical disk, and this reflectance fluctuates depending on the type of material used for the information recording layer.

Every BD-RE/R that is currently under development employs a layer of a phase-changeable material as its information recording layer. Such an information recording layer is crystalline in an initial state before receiving light irradiation, but once receiving light irradiation for a data write, becomes amorphous through a rapid heating/cooling process. The portions which have become amorphous are the "recording marks", where light reflectance is locally lowered as compared to any portion where recording marks are not formed (i.e., space). Thus, changes in the reflectance of the information recording layer are detected as an RF signal.

In the future, there is a possibility that the information recording layers of BD-Rs may be formed of an organic dye-type material, instead of a phase-changeable material. In order to write data to an information recording layer which is composed of an organic dye-type material, it is necessary to heat a portion of the information recording layer through laser irradiation and decompose the dye. Depending on the organic dye-type material, the reflectance of a portion where the dye of the information recording layer has been decomposed may become higher or lower than the reflectance of the other portions (spaces). Thus, in the case of a BD-R including an information recording layer which is composed of an organic dye-type material, the reflectance is likely to greatly vary from optical disk to optical disk. Therefore, in the case of an organic dye-type BD-R, in order to set the "modulation factors" of push-pull TE's which are obtained from the management area and the user area so as to be within predetermined ranges, it is necessary to adjust the amplitude PP of each push-pull TE itself to be within an appropriate range.

On the other hand, with respect to push-pull TE's, the BD specifications defines the following relationship between the modulation factor in an area where data is not recorded (unrecorded area) and the modulation factor in an area where data is recorded:

$$0.75 \leq (\text{modulation factor in recorded area})/(\text{modulation factor in unrecorded area}) \leq 1.25. \quad \text{eq. 1}$$

It is relatively easy to satisfy eq. 1 for a BD-R of the phase-changeable material type. However, as described above, a BD-R of the organic dye type will have large fluctuations in reflectance, and therefore it will be necessary to adjust the amplitude PP of the push-pull TE in order to satisfy eq. 1. In the case where the track pitch is defined at a specific value, it is necessary to adjust the depth of the guide groove in order to adjust the push-pull TE. However, the depth of the guide groove is constant, irrespective of the user area or the management area. Therefore, if the guide groove depth is set so as to satisfy eq. 1 with respect to a push-pull TE which is obtained from the user area, the modulation factor of a push-pull TE which is obtained from the management area may inevitably become lower.

The present embodiment will illustrate an optical disk apparatus which is capable of performing a proper disk determination even when the modulation factor of a push-pull TE which is obtained from the management area has become lower.

Figure 15:
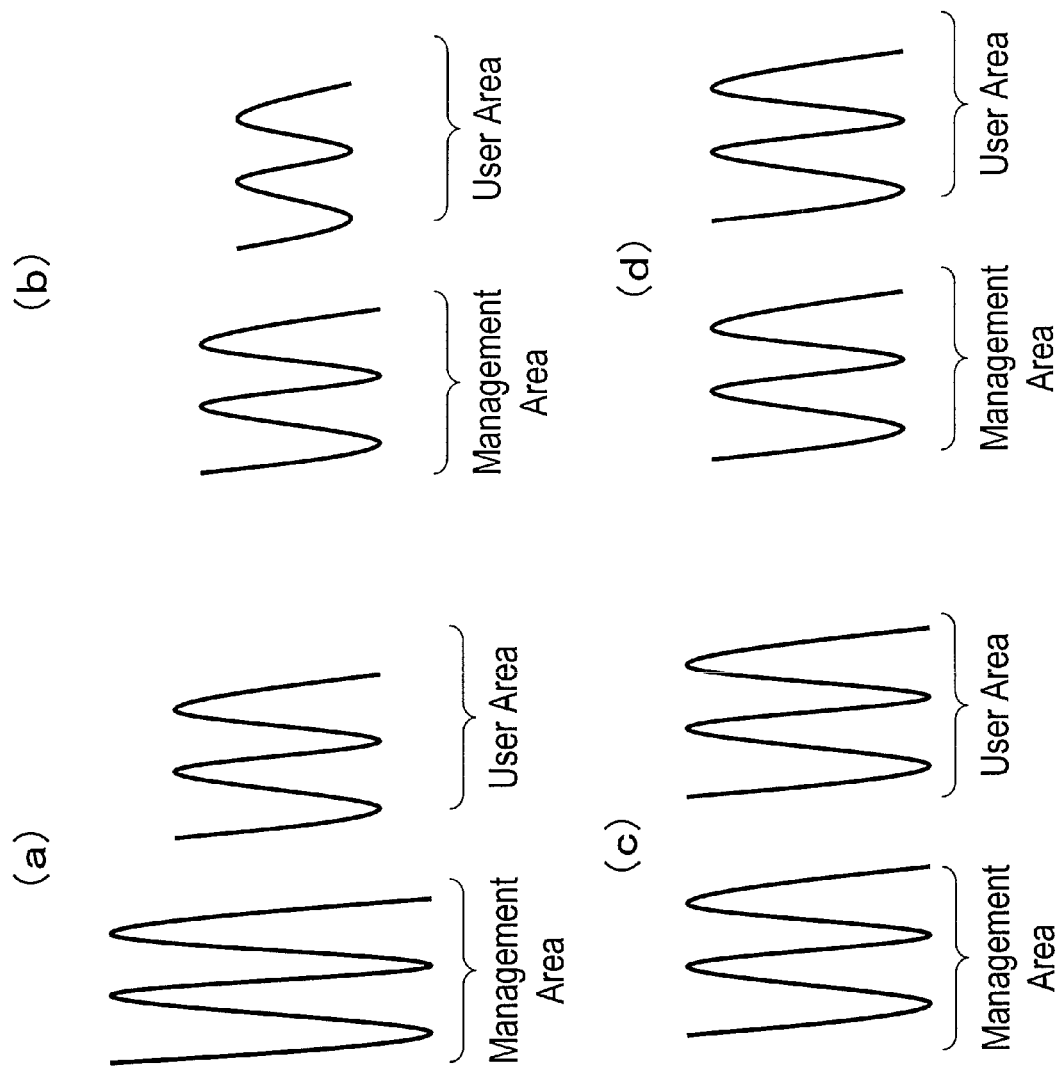
[FIG. 15] (a) to (d) are diagrams schematically showing waveforms of a normalized push-pull TE (PP/AS), where 5(a) and (b) show waveforms obtained from a BD-RE/R; and (c) and (d) show waveforms obtained from a BD-ROM.

In FIG. 15, (a) to (d) each schematically show the waveform of a normalized push-pull TE (PP/AS). FIG. 15(a) and FIG. 15(b) show waveforms obtained from a BD-RE/R; and FIG. 15(c) and FIG. 15(d) show waveforms obtained from a BD-ROM.

As compared to the waveforms shown at the left side of FIG. 15 (FIG. 15(a), (c)), the waveforms shown at the right side of FIG. 15 (FIG. 15(b), (d)) have a relatively small amplitude (modulation factor).

If the "modulation factor" of the management area has become lower for the aforementioned reason or the like, as shown in FIG. 15(b) and FIG. 15(c), the modulation factor of a BD-RE/R and the modulation factor of a BD-ROM may become substantially equal, thus making it difficult to distinguish between the two. However, even in such a case, a BD-RE/R can be distinguished from a BD-ROM by measuring the ratio of the modulation factor in the user area to the modulation factor in the management area.

Specifically, in a BD-ROM, regardless of any increase or decrease in the modulation factors, the modulation factor in the management area will be substantially equal to the modulation factor in the user area. On the other hand, in a BD-RE/R, regardless of any increase or decrease in the modulation factors, the modulation factor in the management area will be sufficiently larger than the modulation factor in the user area. Therefore, based on a ratio of the modulation factor in the user area to the modulation factor in the management area, it is possible to distinguish between a BD-RE/R and a BD-ROM.

hereinafter, an optical disk apparatus according to the present embodiment will be described.

Figure 10:
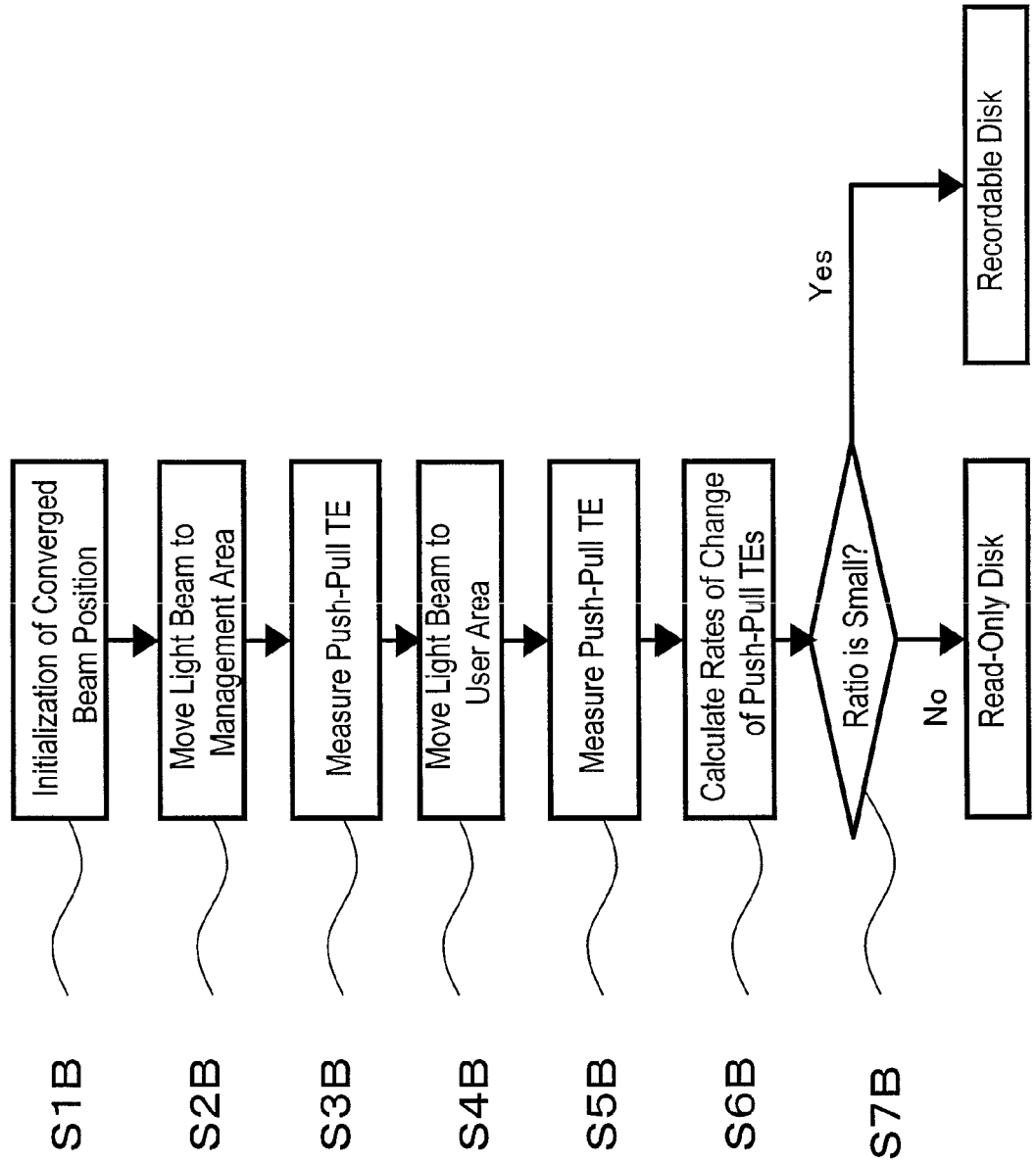
[FIG. 10] A flowchart showing an operation of the optical disk apparatus according to Embodiment 3 of the present invention.

The optical disk apparatus of the present embodiment has a construction which is similar to the constructions of the optical disk apparatuses of Embodiment 1 and Embodiment 2, there being a difference concerning its flow of operation. Therefore, the present embodiment will be described with reference to the flowchart of FIG. 10 below.

Firstly, when the optical disk 501 is mounted to the optical disk apparatus as shown in FIG. 1, at step S1B, in order to determine a basis for the absolute position of the light beam 504, the stepper 512 is driven so as to move the light beam 504 to the initial light beam position 513 (initialization of converged beam position).

Next, at step S2B, the light beam 504 is moved to an intermediate position in the management area 502. Specifically, a number of pulses which will allow the irradiated position of the light beam 504 to move to an intermediate position in the management area 502 are sent from the stepper pulse command 514 to the stepper 512, thus driving the stepper 512.

At step S3B, the management area 502 of the optical disk 501 is irradiated with the light beam 502, and reflected light from the management area 502 is converted by the light-receiving section 505 into an electrical signal. The push-pull TE detection circuit 506 generates a push-pull TE from the output of the light-receiving section 505. The amplitude or modulation factor of the push-pull TE thus obtained is measured, and stored in a memory (not shown).

Next, at step S4B, the light beam 504 is moved to a certain position in the user area. Specifically, a number of pulses which will allow the irradiated position of the light beam 504 to move from the management area 502 toward the disk's outer periphery by a predetermined distance are sent from the stepper pulse command 514 to the stepper 512, thus driving the stepper 512.

At step S5B, the user area of the optical disk 501 is irradiated with the light beam 502, and reflected light from the user area is converted by the light-receiving section 505 into an electrical signal. The push-pull TE detection circuit 506 generates a push-pull TE from the output of the light-receiving section 505. The amplitude or modulation factor of the push-pull TE thus obtained is measured, and stored in a memory (not shown).

At step S7B, a ratio (Y/X) of the amplitude or modulation factor (Y) of the push-pull TE which is obtained from the user area to the amplitude or modulation factor (X) of the push-pull TE which is obtained from the management area 512 is calculated. If this ratio is close to one (e.g., no less than 0.7 and no more than 1.3), a determination of a BD-ROM is made, and if the ratio is smaller or greater than a predetermined value (e.g., less than 0.7 or more than 1.3), a determination of a BD-RE/R is made.

Thus, in the present embodiment, a disk determination is made by paying attention to the fact that the amplitude or modulation factor of a resultant push-pull TE will differ between the management area and the user area of a BD-RE/R. Especially in the case of an optical disk whose information recording layer is formed of an organic dye-type material, e.g., a BD-R, the reflectance will fluctuate from optical disk to optical disk, and therefore the modulation factor of the push-pull TE is also likely to fluctuate. Therefore, if a disk determination is made based only on the modulation factor of a push-pull TE which is obtained from the management area, as in the optical disk apparatus of Embodiment 1, an incorrect determination may be made in the case where the reflectance of the optical disk varies from medium to medium. However, with the optical disk apparatus of the present embodiment, even if the reflectance of the entire optical disk fluctuates, a difference in the modulation factor level of the push-pull TE which is associated with a track pitch difference between the management area and the user area can be accurately detected. As a result, the determination method of the present embodiment, which is based on a difference between the management area and the user area, will prove very effective when BD-Rs have gained prevalence.

Figure 16:
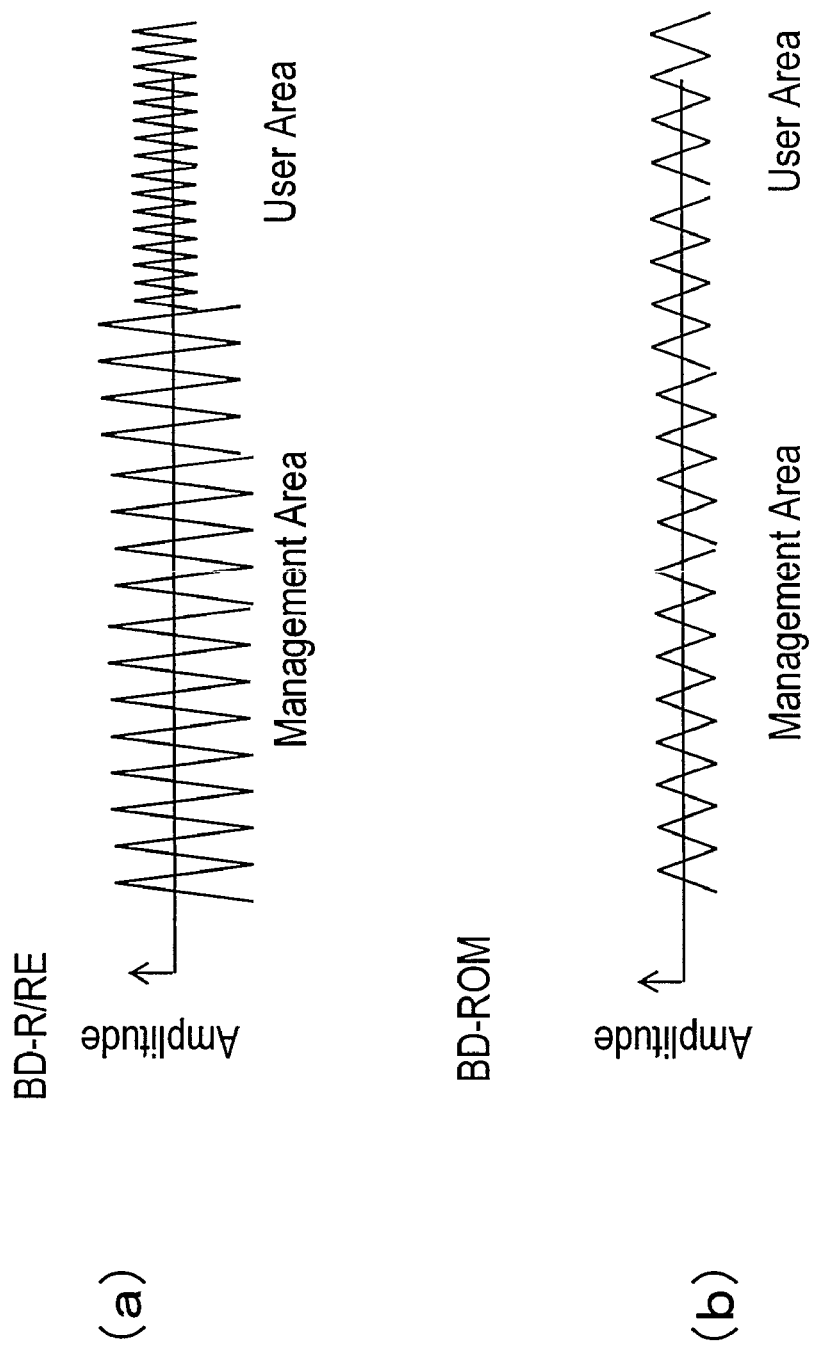
[FIG. 16] (a) is a diagram showing a push-pull TE which is obtained from a border portion between a management area and a user area of a BD-RE/R; and (b) is a diagram showing a push-pull TE which is obtained from a border portion between a management area and a user area of a BD-ROM.

In the present embodiment, after measuring the amplitude or modulation factor of a push-pull TE from the management area, the light beam spot is moved to the user area to measure the amplitude or modulation factor of a push-pull TE from the user area. However, this order is arbitrary. Furthermore, the light beam spot may be moved to the border portion between the management area and the user area. In this case, the light beam spot will alternately reciprocate between the management area and the user area, with the rotation of an eccentric optical disk. As a result, as shown in FIG. 16($a$), a signal in which a push-pull TE from the management area and a push-pull TE from the user area alternately appear will be obtained for a BD-RE/R, thus distinguishing itself from a BD-ROM for which only a substantially constant push-pull TE is obtained as shown in FIG. 16($b$).

Note that, the constituent elements such as the circuitry shown in FIG. 5, FIG. 7, and FIG. 9 may be constructed in hardware, or implemented as software or a combination of hardware and software.

Embodiment 5

The present invention is also applicable to a BD player (read-only apparatus).

Hereinafter, an embodiment of a BD player will be described. The BD player of the present embodiment also includes constituent elements similar to the constituent elements comprised in the optical disk apparatuses of the respective embodiments above, there being a difference concerning the method of disk determination.

On a brand-new BD-RE/R, no data is recorded in the management area or the user area. However, on a BD-RE/R having user data recorded thereon, no data is recorded in the management area, but some data is recorded in the user area. On the other hand, on a BD-ROM, data is recorded in both the management area and the user area.

The present embodiment utilizes the above facts. Specifically, a ratio Z of the modulation factor (PP/AS) which is obtained from the user area to the modulation factor (PP/AS) which is obtained from the management area is measured, and based on the value of the ratio Z, it is possible to determine whether the mounted optical disk is a reproducible optical disk or not.

In the case of a BD-ROM, the aforementioned ratio Z has a value close to one (e.g., in a range of $0.7 \leq Z \leq 1.3$). On the other hand, in the case of a brand-new BD-RE/R, no data is recorded in the management area or the user area, and therefore the aforementioned ratio Z is in a range of $0.5 \leq Z \leq 0.7$, for example. On the other hand, in the case of a BD-RE/R to which user data has already been written, the modulation factor of a push-pull TE which is obtained from the user area greatly varies, and therefore the ratio Z is in a range of $Z<0.5$ (or a range of $Z>1.3$), for example.

Thus, if the mounted optical disk is determined as a brand-new BD-RE/R (e.g., $0.5 \leq Z \leq 0.7$) based on the value of this ratio Z, an On-Load or error indication is promptly given, without even booting the player. On the other hand, if the mounted optical disk is determined a recorded BD-RE/R which is in a reproducible state or a BD-ROM ($Z<0.5$ or $Z>1.3$), the apparatus is booted to enable transition to a reproduction operation.

On the other hand, the aforementioned determination can also be made by using a phase difference TE. In the case of a brand-new BD-RE/R, there is very little or no phase difference signal TE obtained either from the management area or the user area. On the other hand, in the case of a recorded BD-RE/R, there is very little or no phase difference TE obtained from the unrecorded management area, but a phase difference TE which is large relative to the phase difference TE from the management area is output from the recorded user area.

Moreover, from the management area and user area of a BD-ROM, a phase difference TE is obtained which is sufficiently larger than a phase difference TE obtained from the management area of a recorded BD-RE/R. Instead of a phase difference TE, presence/absence of an RF signal may also be used.

Thus, by performing a determination by considering a track position signal or RF signal which is obtained not only from the management area but also from the user area, an optical disk (BD-ROM, recorded BD-RE/R) which is capable of being reproduced on a BD player can be properly distinguished from an optical disk (unrecorded BD-RE/R) which does not even require reproduction.

Another Embodiment

Next, with reference to FIG. 11, another embodiment of the optical disk apparatus according to the present invention will be described. This embodiment comprises a known optical pickup 1300 which includes the objective lens 503, the light-receiving section 505, and the like shown in FIG. 5; a disk motor 1302 for rotating the optical disk 501; and a portion which performs various signal processing.

Figure 11:
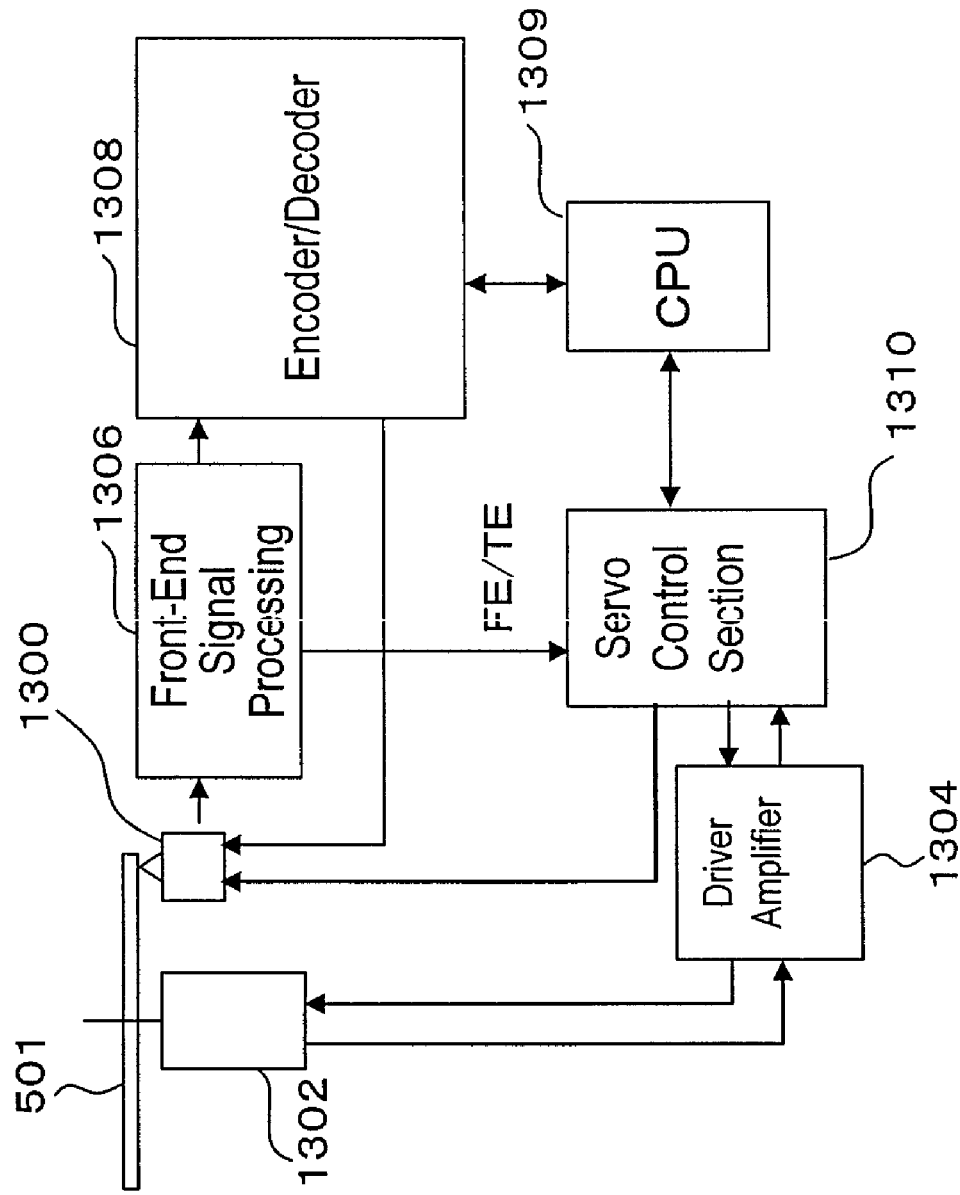
[FIG. 11] A construction diagram showing another embodiment of the optical disk apparatus according to the present invention.

In the example shown in FIG. 11, the output of the optical pickup 1300 is sent to an encoder/decoder 1308 via a front-end signal processing section 1306. During a data read, the encoder/decoder 1308 decodes the data which is recorded on the optical disk 501, based on a signal which is obtained by the optical pickup 1300. During a data write, the encoder/decoder 1308 encodes user data, generates a signal to be written to the optical disk 501, and sends it to the optical pickup 1300.

The front-end signal processing section 1306 generates a reproduction signal based on the output of the optical pickup 1300, and also generates a focus error signal FE and a tracking error signal TE. The front-end signal processing section 1306 is capable of realizing the functions of the push-pull TE detection circuit 506, the phase difference TE detection circuit 507, the amplitude measurement circuit 506, and the like which are shown in FIG. 5.

The focus error signal FE and the tracking error signal TE are sent to a servo control section 1310. The servo control section 1310 controls the disk motor 1302 via a driver amplifier 1304, while also controls the position of the objective lens via an actuator in the optical pickup 1300. Constituent elements such as the encoder/decoder 1308 and the servo control section 1310 are controlled by a CPU 1309.

In the present embodiment, by the action of a software program or firmware (not shown), an operation as shown in the flowchart of FIG. 6 is executed, thereby determining whether the mounted optical disk 501 is a BD-ROM or a BD-RE/R.

Thus, the present invention has been specifically described with respect to embodiments thereof. However, the present invention is not to be limited to the above embodiments.

In the case where the optical disk has large radial deviation, or the stepper 512 has a poor feed accuracy such that an accurate movement to the management area 502 is difficult, detection of an RF signal or wobble signal may be retried each time the position of the objective lens 503 is moved by a predetermined amount in the disk radial direction by a lens actuator. After a certain number of moves, if no phase difference TE or RF signal from the management area 502 is detected, or a wobble signal from the management area 502 is detected, the optical disk 501 can be determined as a recordable optical disk.

Moreover, an optical disk that is useable in an optical disk apparatus according to the present invention is not limited to an optical disk which includes a single information recording layer, but may also be a multilayer optical disk which includes a plurality of information recording layers. Furthermore, a hybrid optical disk which includes an information recording layer that is compliant with the CD or DVD specifications and an information recording layer that is compliant with the BD specifications may also be used. However, the information recording layer compliant with the BD specifications needs to have a management area in the same position, regardless of recordable or read-only.

Note that, before determining whether a mounted optical disk 501 is a BD-ROM or a BD-RE/R, it is preferable to perform a known operation for determining whether the mounted optical disk is a BD, a DVD, or a CD. In this case, after the mounted optical disk has been determined to be a BD, a disk determination according to the present invention is performed to determine whether the BD is read-only or recordable.

INDUSTRIAL APPLICABILITY

In accordance with an optical disk apparatus of the present invention, it can be rapidly determined before commencing tracking control as to whether an optical disk is recordable or read-only, and therefore the time for carrying out steps necessary for tracking control can be eliminated, thus reducing the amount of time until reproduction of the optical disk. Thus, it is useful as an optical disk apparatus which is capable of supporting a plurality of types of optical disks with a single apparatus.

The invention claimed is:

1. An optical disk apparatus for performing at least one of: reproducing data from an optical disk selected from among a plurality of types of optical disks including a recordable optical disk and a read-only optical disk which are produced according to the BD specifications; and recording data to the recordable optical disk, the optical disks each having a management area and a user area that is positioned outside the management area wherein the track pitch in the management area is broader than the track pitch in the user area, the optical disk apparatus comprising:

means for irradiating the management area of an optical disk with a light beam while not performing tracking control, and generating a push-pull tracking error signal from light which is reflected by the management area; and disk determination means for determining, based on the push-pull tracking error signal obtained from the management area, whether the optical disk mounted in the optical disk apparatus is a recordable optical disk or a read-only optical disk.

2. The optical disk apparatus of claim 1, wherein the recordable optical disk is a BD-R or a BD-RE, and the read-only optical disk is a BD-ROM.

3. The optical disk apparatus of claim 2, wherein the management area is a PIC area.

4. The optical disk apparatus of claim 1, wherein the disk determination means determines, when a phase difference tracking error signal is not obtained from the management area, that the optical disk mounted in the optical disk apparatus is a recordable optical disk.

5. The optical disk apparatus of claim 1, wherein the disk determination means performs the determination based on a quality of the push-pull tracking error signal.

6. The optical disk apparatus of claim 5, wherein the quality of the track position signal is defined by a measured value of at least one of a modulation factor and a symmetry of the push-pull tracking error signal.

7. The optical disk apparatus of claim 6, wherein the disk determination means includes comparison means for comparing the measured value against a threshold value, and performs the determination in accordance with an output of the comparison means.

8. The optical disk apparatus of claim 1, wherein the disk determination means performs the determination based on whether or not a wobble signal is extractable from the push-pull tracking error signal.

9. The optical disk apparatus of claim 1, wherein:
while not performing tracking control, the means for generating a push-pull tracking error signal irradiates the user area with a light beam, and generates a push-pull tracking error signal from light reflected by the user area; and based on the push-pull tracking error signal obtained from the management area and the push-pull tracking error signal obtained from the user area, the disk determination means determines whether the optical disk mounted in the optical disk apparatus is a recordable optical disk or a read-only optical disk.

10. The optical disk apparatus of claim 9, wherein, based on a ratio of the push-pull tracking error signal obtained from the user area to the push-pull tracking error signal obtained from the management area, the disk determination means determines whether the optical disk mounted in the optical disk apparatus is a recordable optical disk or a read-only optical disk.

11. The optical disk apparatus of claim 1, wherein,
while not performing tracking control, the means for generating the track position signal irradiates with a light beam a border portion between the management area and the user area of the optical disk; and based on the push-pull tracking error signal obtained from the management area and the push-pull tracking error signal obtained from the user area, the disk determination means determines whether the optical disk mounted in the optical disk apparatus is a recordable optical disk or a read-only optical disk.

12. A disk determination method in an optical disk apparatus for performing at least one of: reproducing data from an optical disk selected from among a plurality of types of optical disks including a recordable optical disk and a read-only optical disk which are produced according to the BD specifications; and recording data to the recordable optical disk, the optical disks each having a management area and a user area that is positioned outside the management area wherein the track pitch in the management area is broader than the track pitch in the user area, the disk determination method comprising:

a step of irradiating a management area of an optical disk with a light beam while not performing tracking control, and generating a push-pull tracking error signal from light which is reflected by the management area; and a step of determining, based on the push-pull tracking error signal obtained from the management area, whether the optical disk mounted in the optical disk apparatus is a recordable optical disk or a read-only optical disk.

13. An optical disk apparatus for performing at least one of: reproducing data from an optical disk selected from among a plurality of types of optical disks including a recordable optical disk and a read-only optical disk which are produced according to the BD specifications; and recording data to the recordable optical disk, the optical disks each having a management area and a user area that is positioned outside the management area wherein the track pitch in the management area is broader than the track pitch in the user area, the optical disk apparatus comprising:

means for irradiating a management area of an optical disk with a light beam while not performing tracking control, and generating a track position signal from light which is reflected by the management area;

means for irradiating the optical disk with a light beam, and generating an RF signal from light which is reflected by the optical disk; and disk determination means for determining, based on the track position signal or the RF signal obtained from the management area, whether the optical disk mounted in the optical disk apparatus is a recordable optical disk or a read-only optical disk, wherein the disk determination means performs the determination based on a quality of the track position signal, and the quality of the track position signal is defined by a measured value of at least one of a modulation factor and a symmetry of the track position signal.

14. The optical disk apparatus of claim 13, wherein the disk determination means includes comparison means for comparing the measured value against a threshold value, and performs the determination in accordance with an output of the comparison means.

15. An optical disk apparatus for performing at least one of: reproducing data from an optical disk selected from among a plurality of types of optical disks including a recordable optical disk and a read-only optical disk which are produced according to the BD specifications; and recording data to the recordable optical disk, the optical disks each having a management area and a user area that is positioned outside the management area wherein the track pitch in the management area is broader than the track pitch in the user area, the optical disk apparatus comprising:

means for irradiating a management area of an optical disk with a light beam while not performing tracking control, and generating a track position signal from light which is reflected by the management area;

means for irradiating the optical disk with a light beam, and generating an RF signal from light which is reflected by the optical disk; and disk determination means for determining, based on the track position signal or the RF signal obtained from the management area, whether the optical disk mounted in the optical disk apparatus is a recordable optical disk or a read-only optical disk, which, while not performing tracking control, irradiates a user area with a light beam, the user area being positioned outside the management area of the optical disk, and generates a track position signal from light reflected by the user area; and based on the track position signal obtained from the management area and the track position signal obtained from the user area, determines whether the optical disk mounted in the optical disk apparatus is a recordable optical disk or a read-only optical disk.

16. The optical disk apparatus of claim 15, which, based on a ratio of the track position signal obtained from the user area to the track position signal obtained from the management area, determines whether the optical disk mounted in the optical disk apparatus is a recordable optical disk or a read-only optical disk.

17. An optical disk apparatus for performing at least one of: reproducing data from an optical disk selected from among a plurality of types of optical disks including a recordable optical disk and a read-only optical disk which are produced according to the BD specifications; and recording data to the recordable optical disk, the optical disks each having a management area and a user area that is positioned outside the management area wherein the track pitch in the management area is broader than the track pitch in the user area, the optical disk apparatus comprising:

means for irradiating a management area of an optical disk with a light beam while not performing tracking control, and generating a track position signal from light which is reflected by the management area;

means for irradiating the optical disk with a light beam, and generating an RF signal from light which is reflected by the optical disk; and disk determination means for determining, based on the track position signal or the RF signal obtained from the management area, whether the optical disk mounted in the optical disk apparatus is a recordable optical disk or a read-only optical disk, wherein while not performing tracking control, the means for generating the track position signal irradiates with a light beam a border portion between the management area and a user area of the optical disk, the user area being positioned outside the management area; and based on the track position signal obtained from the management area and the track position signal obtained from the user area, the optical disk apparatus determines whether the optical disk mounted in the optical disk apparatus is a recordable optical disk or a read-only optical disk.

* * * * *